F. A. STEVENSON.
TOP REAMING MACHINE.
APPLICATION FILED MAR. 4, 1916.

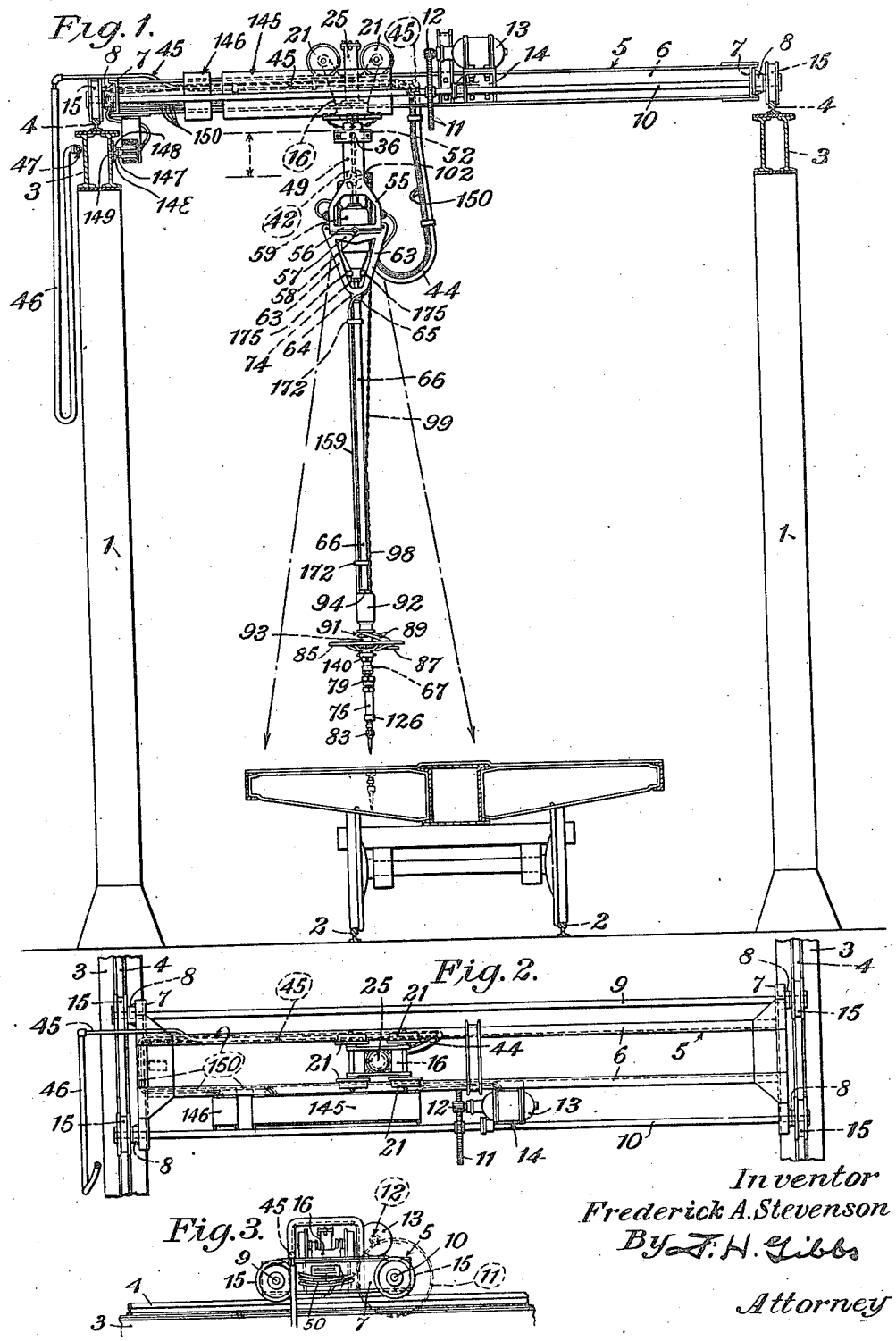

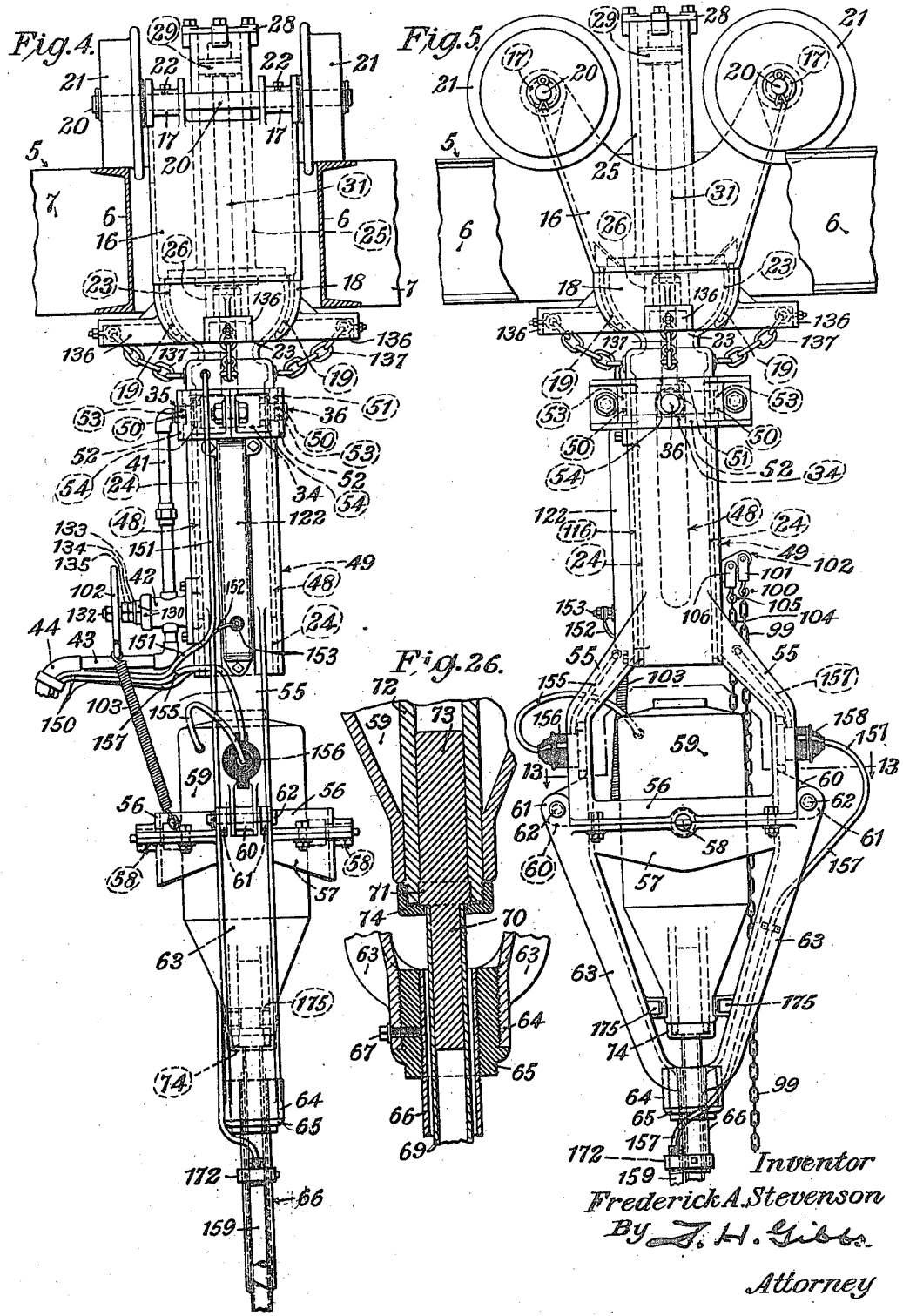

1,256,072.

Patented Feb. 12, 1918.
8 SHEETS—SHEET 3.

Inventor
Frederick A. Stevenson
By F. H. Gibbs
Attorney

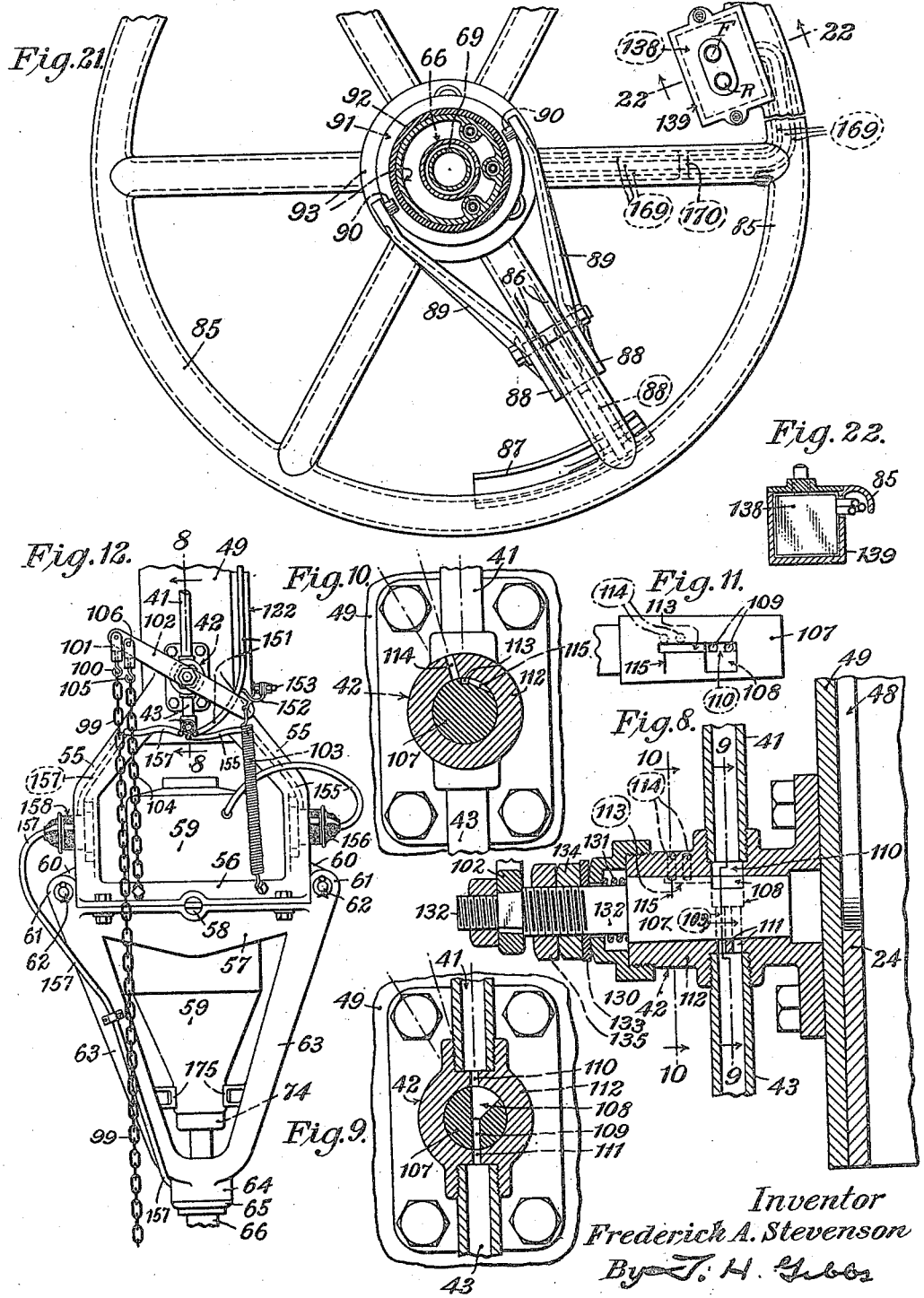

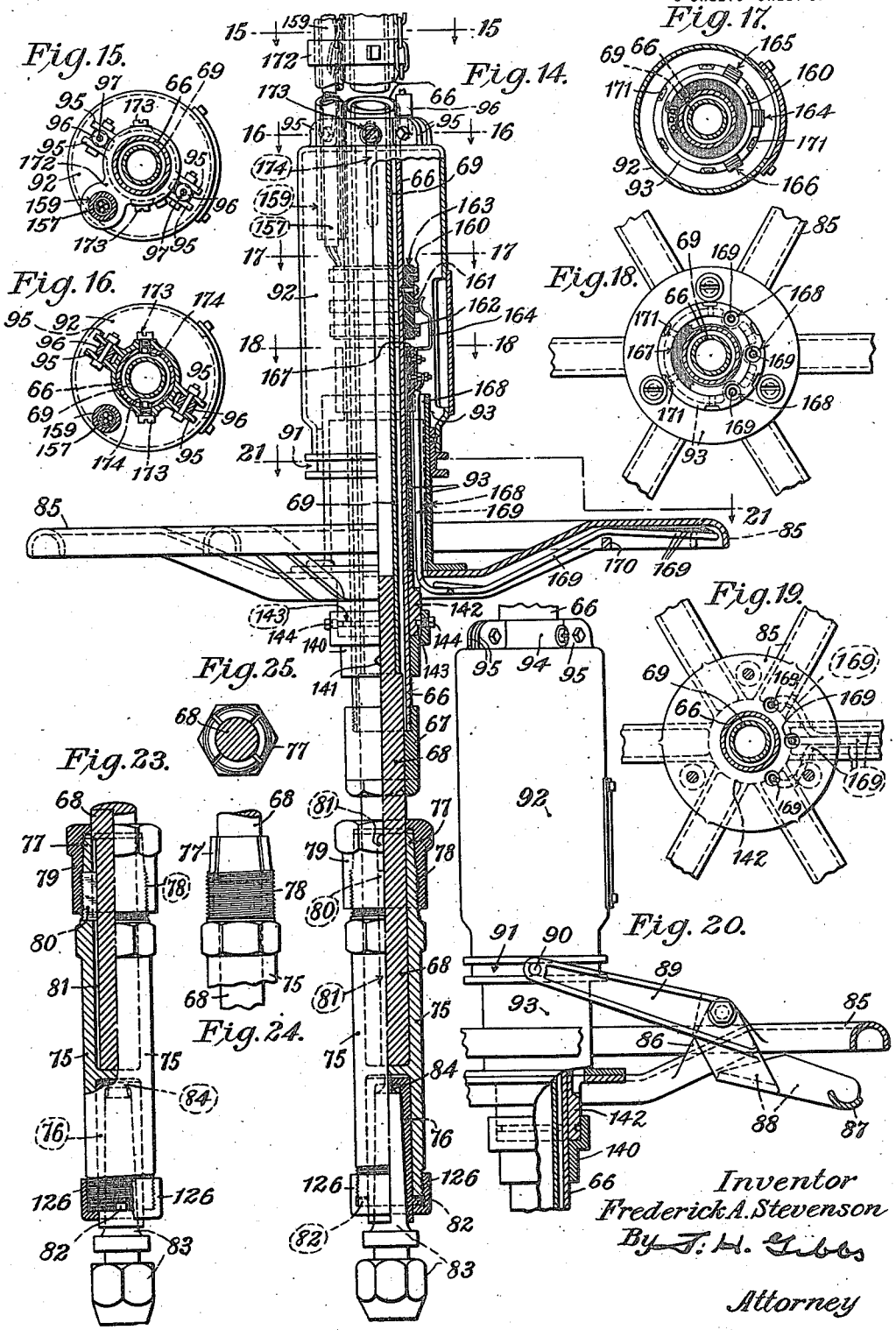

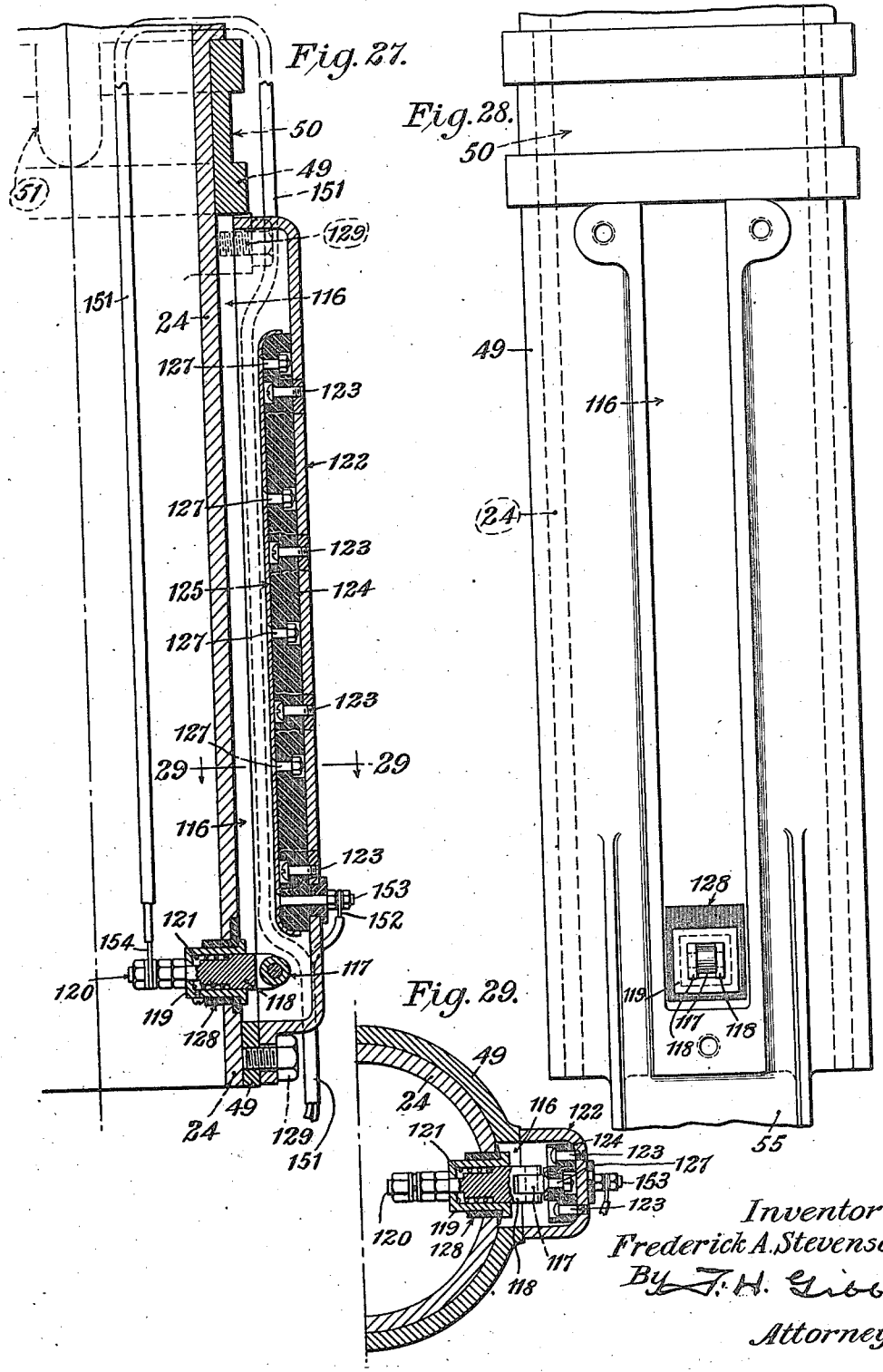

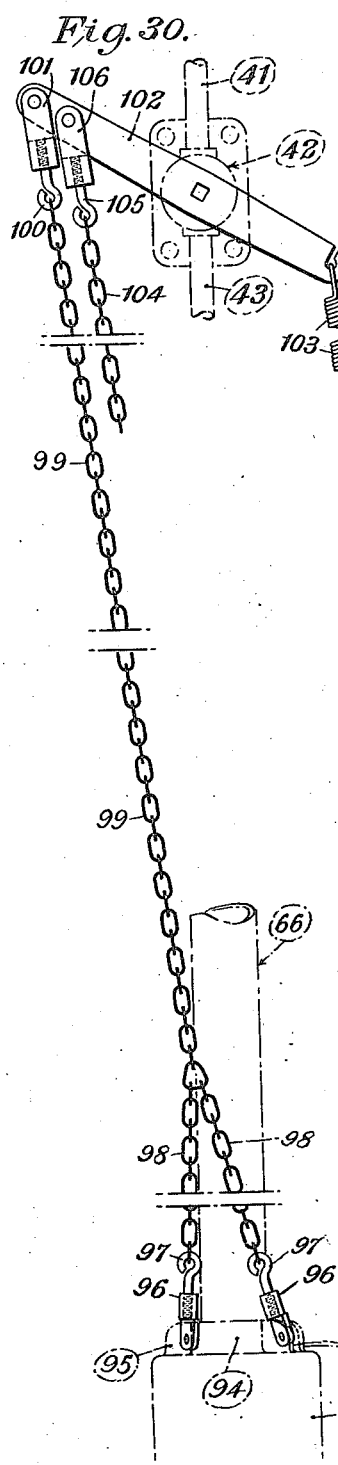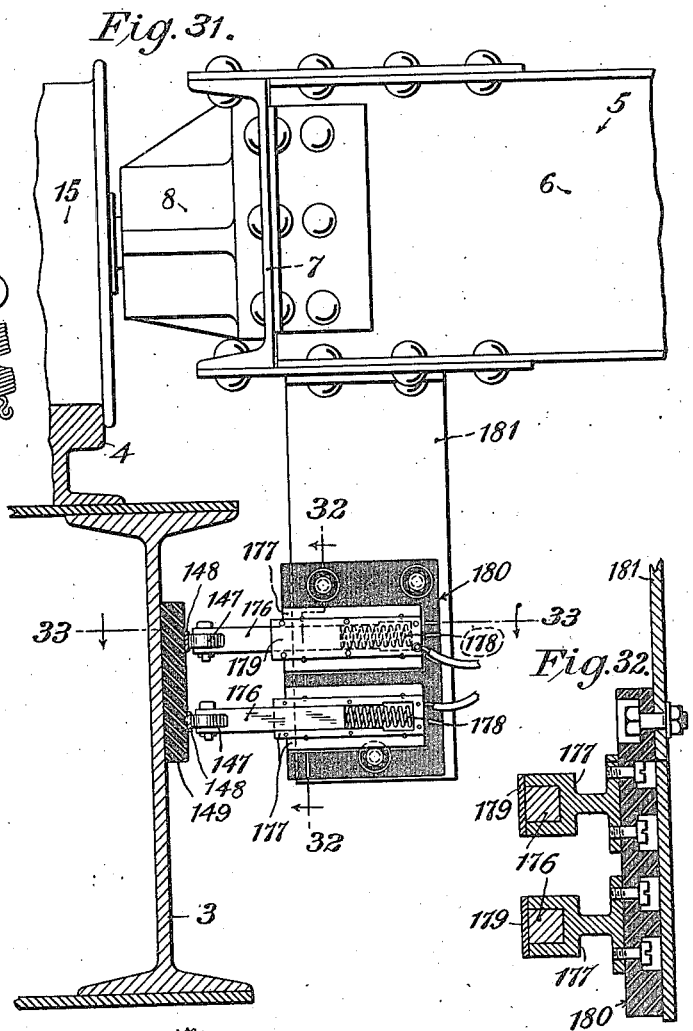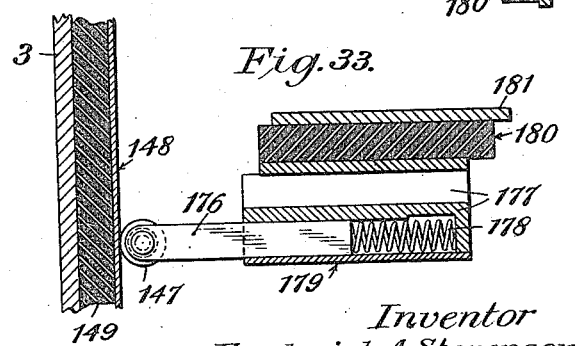

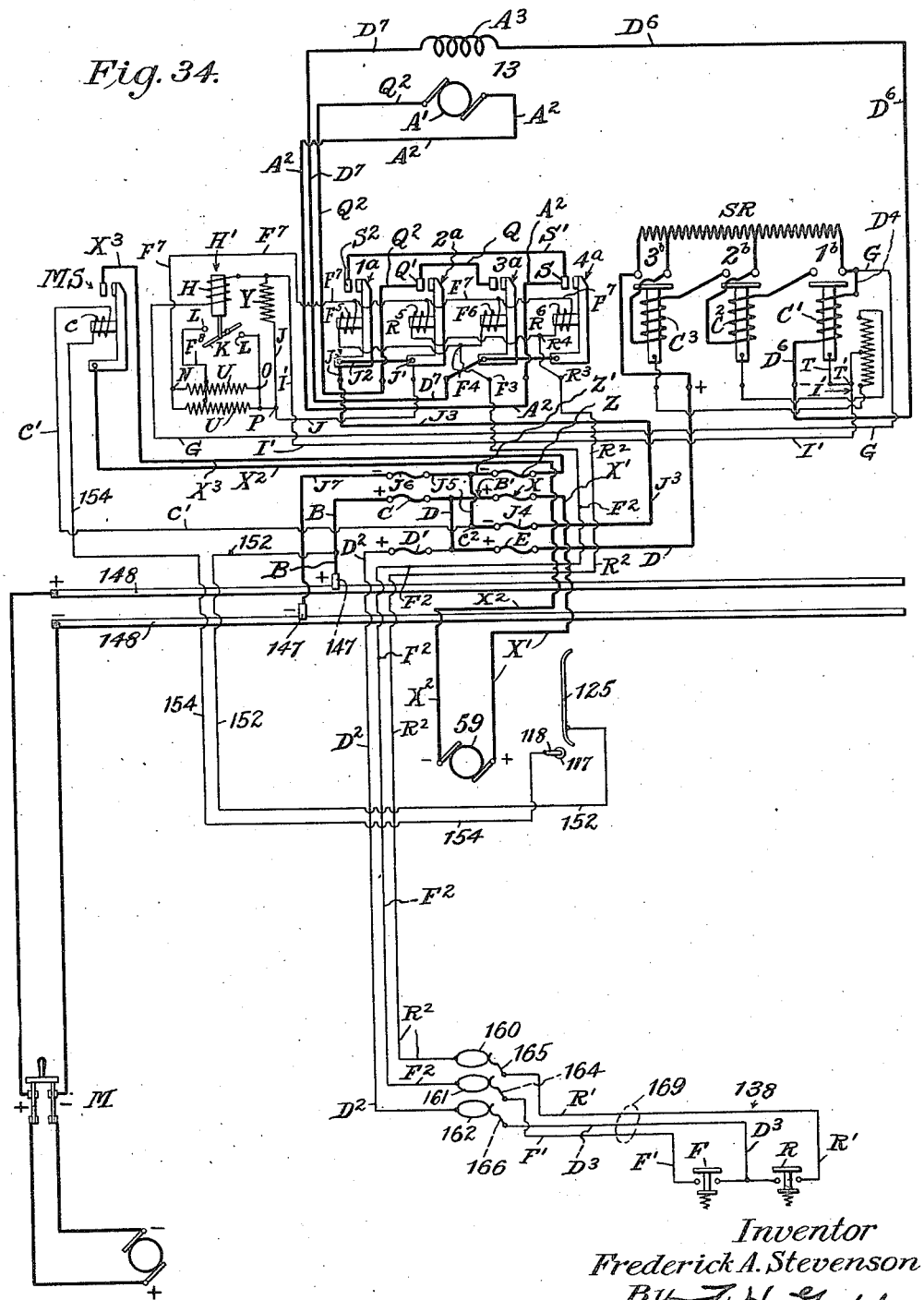

UNITED STATES PATENT OFFICE.

FREDERICK A. STEVENSON, OF DETROIT, MICHIGAN, ASSIGNOR TO AMERICAN CAR AND FOUNDRY COMPANY, OF ST. LOUIS, MISSOURI, A CORPORATION OF NEW JERSEY.

TOP REAMING-MACHINE.

1,256,072.   Specification of Letters Patent.   Patented Feb. 12, 1918.

Application filed March 4, 1916. Serial No. 82,118.

*To all whom it may concern:*

Be it known that I, FREDERICK A. STEVENSON, residing at Detroit, Michigan, and being a citizen of the United States, have invented certain new and useful Improvements in Top Reaming-Machines, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described except as required by the scope of the appended claims, as it is obvious that various modifications thereof will occur to persons skilled in the art.

In said drawings:

Figure 1 is a transverse sectional view through such a car building track as is present in the Detroit shops of the American Car & Foundry Company, and shows mounted thereupon my improved reaming machine together with the pneumatic and electrical supply connections.

Fig. 2 is a plan view of a portion of Fig. 1.

Fig. 3 is an end elevation showing the end of the traveler of my reaming machine.

Fig. 4 is an elevational view of the upper portion of my reaming machine, parts of the traveler being broken away and some parts being shown in section.

Fig. 5 is an elevational view of those parts shown in Fig. 4, but viewed at right angles thereto.

Fig. 8 is a vertical section taken on line 8—8 of Fig. 12, and shows the valve controlling the air conditions in the air cylinder of Fig. 6.

Fig. 9 is a vertical section on line 9—9 of Fig. 8, showing the valve in condition for admitting air to the air cylinder.

Fig. 10 is another vertical section on line 10—10 of Fig. 8, showing the relation of other ports for the valve.

Fig. 11 is a plan view of the valve, some of the ports in the valve housing being indicated in dotted lines.

Fig. 12 is a fragmentary elevational view of that side of the upper portion of the reaming machine which is opposite to that shown in the lower portion of Fig. 5.

Fig. 14 is an enlarged view of the lower portion of the reaming machine, those parts on the right being principally shown in section.

Figure 6:
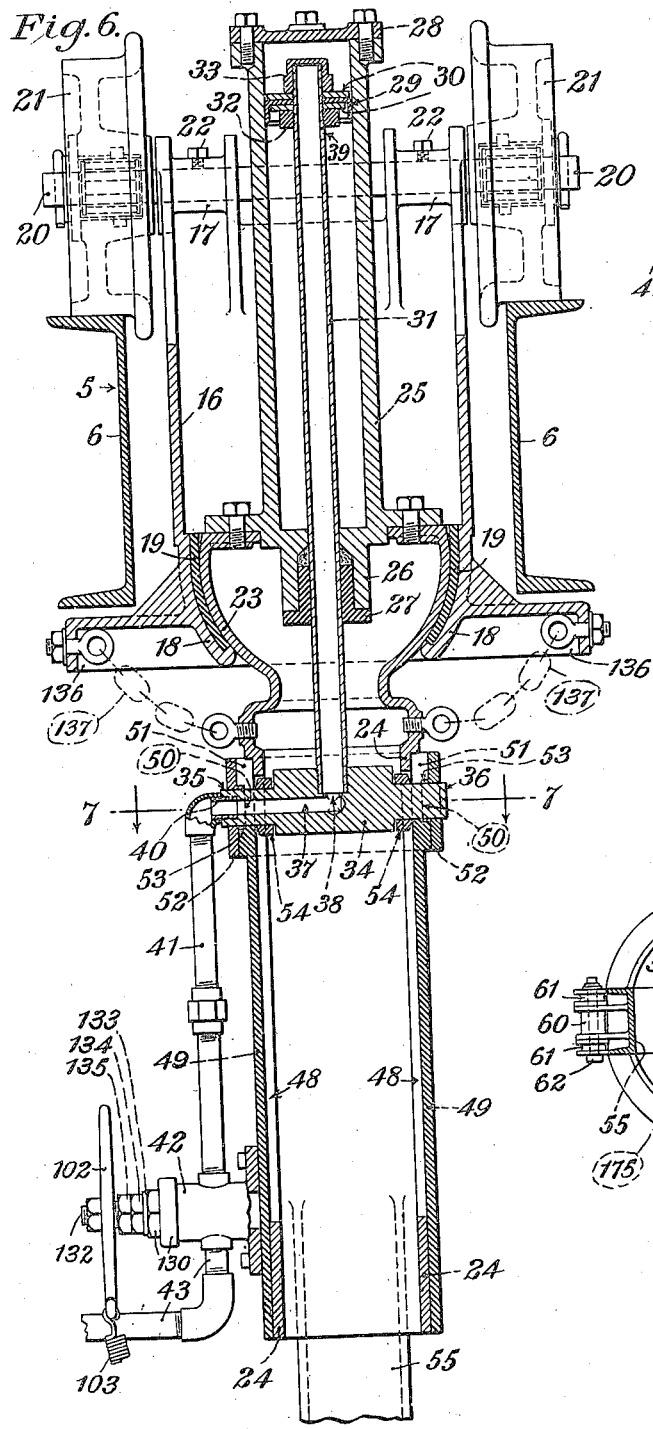
Fig. 6 is a vertical central section on an enlarged scale, through the upper portion of my reaming machine, showing the pneumatic arrangements.
Figure 7:
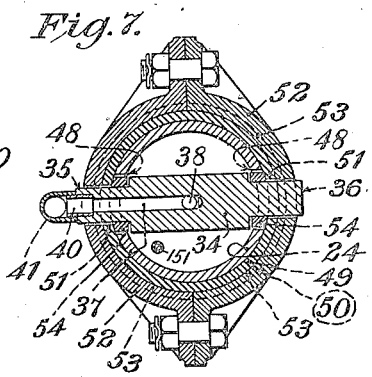
Fig. 7 is a horizontal section taken on line 7—7 of Fig. 6.
Figure 13:
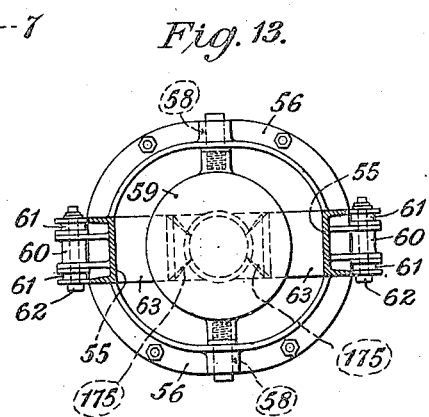
Fig. 13 is a horizontal section on line 13—13 of Fig. 5 and discloses the reamer motor mounted in the reamer yokes.

Figs. 15, 16, 17 and 18 are horizontal sections on lines 15—15, 16—16, 17—17 and 18—18, respectively, of Fig. 14, the switch being omitted in Fig. 18.

Fig. 19 is a horizontal section similar to that shown in Fig. 18, but with the hand wheel sleeve removed to more clearly illustrate the arrangement of the electrical conductors which run to racking motor switch.

Fig. 20 is an elevation of the valve operating handle, some parts being shown in section.

Fig. 21 is a horizontal section on line 21—21 of Fig. 14, and shows the arrangement of the valve operating handle, the continuance of the conductors shown in Fig. 19 to the racking motor switch, said switch being shown in plan.

Fig. 22 is a vertical section on line 22—22 of Fig. 21, through the racking motor switch-containing box.

Fig. 23 is a view principally an elevation of the lower portion of the reaming machine, some parts being in section to show driving elements and the adjustability of the reamer extension.

Fig. 24 is a fragmentary elevational view showing the upper portion of the reamer extension split.

Fig. 25 is a horizontal section showing the reamer extension in plan.

Fig. 26 is a fragmentary sectional view illustrating the upper end of the reamer spindle secured in the reamer motor spindle.

Fig. 27 is a vertical section depicting the make and break switch located on the reamer upper yoke.

Fig. 28 is an elevational view of the parts shown in Fig. 27, with the housing which carries the contact strip removed, and as viewed at right angles to Fig. 27.

Fig. 29 is a horizontal section taken on line 29—29 of Fig. 27.

Fig. 30 is an enlarged view illustrating the valve lever connected by chains to the switch cage, the lever restraining chain, and the lever positioning spring.

Fig. 31 is a fragmentary transverse section showing the contact roller devices supported from the traveler and contacting with the contact strips carried by the overhead box girder of the car building structure.

Fig. 32 is a vertical section on line 32—32 of Fig. 31 and shows the contact rollers attached to the depending support from the traveler.

Fig. 33 is a horizontal section taken on line 33—33 of Fig. 31, showing one of the contact rollers engaging the contact strip, and Fig. 34 is a diagrammatic view of the electrical circuits embodied in the reaming machine.

My present invention relates to reaming machines and particularly to that type which is used for reaming holes vertically in car parts, such as under-frames.

Fig. 1 illustrates such a reaming machine mounted upon an overhead structure constituting what is known as a building track in the car building industry, and this figure has been constructed substantially in accordance with an arrangement in service in the Detroit shops of the American Car & Foundry Company.

Heretofore it has been customary in reaming work to employ hand reamers, the use of which necessitated two operators, whereas with the machine herein disclosed a single operator is all that is required. In reaming an under-frame, for example, it has been usual for two men to stand upon the under frame, and to grasp handles projecting from the reamer motor casing. At best, the footing of the operators on skeleton-like work with uneven surfaces is precarious, and the weight of the hand reaming machine, which is usually upward of 100 lbs., is such that it is with great difficulty that they are able to swing the old type reamer from one hole to be reamed to another, and at the same time be sure that they are maintaining a proper footing to manipulate this unwieldy tool.

To keep the weight of hand reamers within such limits that the workmen can manipulate them with any facility at all, their sizes and horsepower are restricted to an undesirable degree. In the reaming machine herein disclosed, the lifting is pneumatically accomplished and a reaming motor several times more powerful than those used in hand reamers may be employed, improving the character and increasing the amount of work performed.

It is a matter well recognized that serious injuries are constantly occurring during such operations because of the conditions just spoken of, and very frequently either or both operators are injured upon a tendency of the reamer bit to stick in a hole in the work. When said reamer bit, and consequently the parts that rotate with it, becomes wedged, or for any reason tends to stop rotating, the reamer casing, which is also a motor casing and supposed to remain relatively stationary, begins to rotate upon the armature in the reamer motor becoming stationary, and, as this occurs unexpectedly, the operators are frequently thrown from the car, sustaining in many instances injuries which not only incapacitate them for further work, but often result in fractured limbs or heads.

It is one of the purposes of this invention to entirely eliminate such danger to those who are engaged in reaming operations, and greater facility in performing work is offered by having the weight of the reaming tool supported in such way as to relieve the operator from contending with it. It has been found that, in view of the perfect safety and the relief from laborious effort, a greater amount of work can be performed in a given time than has been possible through the prior practice, and the manufacturing cost is materially lessened.

It is also an object to permit, what will hereinafter be termed, the reamer bit, and those parts from which it is supported, to be moved within certain limits, which limits include a substantial zone, so that holes within that zone may be reached and reamed without moving the trolley and traveler, hereinafter more fully referred to, to new positions.

An advantageous feature is the automatic opening and closing of the reamer motor circuit, relieving the operator of the necessity of changing the condition in this circuit. It is also the purpose of the present invention to have the device act promptly so that the reamer bit will approach the work rapidly, without loss of time, but, when about to ream, to automatically adjust itself to a proper feeding of the reamer bit through the hole to be reamed.

Care has been taken to so design the parts, that the wires of the electrical circuits will not become tangled because of the relative movement between certain of the parts and, for example, the hand wheel may be turned at will without in any way disturbing the electrical connections between the parts which remain relatively stationary during which turning of the hand wheel, though the wires be secured to parts that do not turn therewith.

As the reaming machine is adapted for general use and different pieces of work are subjected to its treatment, a reamer extension device is incorporated therein whereby the reaming bit may be adjusted to the altitudes of the various planes of any given piece of work. Other advantages becoming apparent hereinafter are all to be considered as coming within the scope of the present invention.

Referring specifically to the parts, and first consulting Fig. 1, 1 indicates the columns of the building track overhead structure, disposed on opposite sides of the rails 2, constituting the building track. The columns 1 on each side of the rails 2 are usually spaced suitable distances apart longitudinally of said building track rails and support box girders 3, and mounted upon each box girder is a rail 4.

Said rails 4 constitute a track for a traveler 5, which traveler may be of any suitable design, but in the form shown comprises a pair of channels 6 substantially spanning the distance between the rails 4, and shorter end channel members 7 connecting channel 6 and extending therebeyond in opposite directions.

Secured to and projecting outwardly from the outer faces of channel 7, are bearings 8 for shafts 9 and 10. Shaft 10 is a driven shaft and carries a gear 11, meshing with which is a pinion 12 on the shaft of the racking motor 13, which is carried by suitable bracket 14, secured to one of the channels 6. Shafts 9 and 10, after passing through the bearings 8, project outwardly on each side of the traveler far enough to carry the traveler wheels 15, which are keyed or otherwise secured thereto, and are arranged to run on rails 4 of the traveler track.

The channels 6 of the traveler are spaced sufficiently apart to permit the interposition of a trolley device, and the upper flanges of said channels 6 constitute tracks for the wheels of said trolley device. The latter comprises preferably, a casting 16, better shown in Figs. 4, 5 and 6, and has sidewalls and inclined end-walls, the upper portions of which extend somewhat above the traveler channels 6, and are formed at each end into a pair of bearings 17. The lower portion 18 of the trolley casting is cup-shaped to form the socket of a ball and socket joint, and is suitably recessed to receive a lining of bearing metal 19, such as Babbitt.

Through each pair of bearings 17, at the opposite ends of the trolley casting passes a shaft 20 for the trolley wheels 21. As indicated in dotted lines in Fig. 6, the wheels are of the roller bearing type, permitting the trolley as a whole to be very easily moved, and said trolley wheel shafts project beyond the outer faces of the wheels they support; said wheels being held in place as by washers and cotter pins. Said trolley wheel shafts 20 are also held from turning by set screws 22, passing through bearings 17 and biting the shaft, the roller bearing wheels rotating easily about the therefore non-rotatable shafts 20.

As shown in Fig. 6, a ball-joint casting has at its upper end a hemispherical form 23, and a lower cylindrical portion 24, and is suspended from the trolley casting 16 by having said hemispherical portion seated within the cup-shaped portion 18 of the trolley casting 16 and lying in intimate contact with the bearing or Babbitt metal lining 19. The upper surface of the hemispherical portion of the ball-joint casting has a horizontal annular flange forming a central circular opening. Mounted upon the flange of said hemispherical portion 23, is the flange of an air cylinder 25. The lower portion of the air cylinder projects through the central circular opening formed by the annular flange of the hemispherical portion 23 of the ball-joint casting, and is shaped into a stuffing-box 26 provided with a gland 27.

The upper end of the air cylinder is closed by a cap 28, securely bolted thereto. Within the air cylinder is a piston comprising, by choice, a leather piston gasket 29, disposed above and below which are washers 30, these parts surrounding a tubular piston rod 31, threaded at its upper end, a nut 32 being mounted thereon and screwed against the underside of the lower washer 30, while a piston cap 33 is screwed upon the upper end of the tubular piston rod 31 closing the same and pressing against the upper surface of the top washer 30.

These parts are best illustrated in Fig. 6, where also the tubular piston rod is seen to pass downwardly through the stuffing-box 26, which is shown as projecting into the hemispherical portion 23 of the ball-joint casting and as projecting further downwardly into the upper cylindrical portion 24 of said casting. The lower end of the tubular piston rod 31, is screw-threaded and inserted into the upper portion of a cross-head 34, the latter having outstanding trunnions 35 and 36. The trunnion 35 is horizontally drilled as at 37, the drilling extending to the center of the cross-head 34, there also being a vertical drilling 38 centrally of said cross-head opening into the first mentioned drilling 37. An air passage is thereby established from the outer end of trunnion 35 through the cross-head 34 and into the tubular piston which communicates by means of a hole 39 with the space in the air cylinder 25 which is present beneath the piston.

Trunnion 35 of cross-head 34 is also counterbored and threaded to receive a short pipe or nipple 40, to which is secured an elbow, there being a pipe connection 41 from said elbow to an air valve 42 which is mounted upon another part, and with that part is to be later described. From the air valve a pipe connection 43 extends downwardly and outwardly as shown in Figs. 4 and 6, the piping being relatively short and having secured to the end thereof an air hose 44.

As indicated in Fig. 1, said air hose 44 forms a loop and is of sufficient length to permit the trolley in which the air cylinder is mounted, to travel transversely of the building track within the limits defined by the box girders 3 supported upon the columns 1. The upper end of said air hose 44 is secured to a down-turned portion of piping 45 which piping, for the most part, is horizontally disposed and is secured to the outer face of the channel 6 which is opposite the channel supporting the motor 13.

As shown in Figs. 1, 2 and 3, said piping 45 parallels the outer face of the channel 6 to which it is attached, and extends to the left until it approaches the proximity of the left hand end of channel 7, here being upturned sufficiently to pass over and beyond said end channel 7 and also beyond the outer plane of the box girder 3. To a short depending pipe extending beyond an elbow and forming a continuation of the conduit is another air hose 46 which in Fig. 1 is shown to be looped and is of sufficient length to permit the traveler composed of channels 6 and 7 to traverse its track 4 in either direction to the desired distances. Air hose 46 continues to and is connected with an air piping 47 which extends longitudinally of the girder 3 and is the usual air trunk line extending the entire length of the building track.

Reverse tracing of the air passages therefore discloses how the fluid pressure is transmitted from the source of air supply to the air valve of the reaming machine, and from thence to the air cylinder, and the purpose of the actuation of the piston in the air cylinder is to raise and lower the parts of the reaming machine which move in unison with the reamer bit, as will be set forth hereinafter, the movement of such parts depending upon the actuation of the air valve 42.

To be seen in Figs. 5 and 6, the cylindrical portion 24 of the ball-joint casting has oppositely disposed slots 48, the length of which corresponds substantially to the vertical travel of the reamer bit and the parts that move therewith. Surrounding said cylindrical portion 24 of the ball-joint casting, is a sleeve portion 49 of the upper reamer yoke, which sleeve portion is that member to which the air valve 42 is secured and with which it moves. In addition to sleeve portion 49, the upper reamer yoke comprises bracket arms 55 and motor inclosing frame 56, later referred to.

As seen in Figs. 4, 5 and 6, the upper end of the sleeve portion 49 of the upper reamer yoke is enlarged to a greater diameter and contains an annular groove 50, and extending from its upper surface downwardly, is provided with short slots 51 open at their upper ends, to the lower portion of which slots the trunnions 35 and 36 of crosshead 34 may be carried. To prevent the withdrawal of said trunnions from slots 51, when the machine is in operative assembly, clamp members 52, having annular tongues 53, which set into the annular groove 50, in the enlarged portion of the sleeve 49 of the upper reamer yoke, are provided and are bolted together to form a continuous clamping annulus about said enlarged upper portion of the sleeve portion 49 of the upper reamer yoke. As trunnions 35 and 36 project through holes in said clamp members 52, and said clamp members in turn are locked by the tongue and groove connection with sleeve 49 of the reamer yoke, cross-head 34 cannot be accidentally withdrawn.

When, upon the proper occasions, the piston in the air cylinder permits cross-head 34 to move downwardly, by reason of the connection of the cross-head through the clamps 52 to the sleeve portion 49 of the upper reamer yoke, said reamer yoke will move downwardly, the slots 48 in the relatively stationary cylindrical portion of the ball-joint casting permitting such movement. To protect the trunnions 35 and 36 from wear and to promote the ease of relative motion between the ball-joint casting and the upper reamer yoke, rollers 54 are mounted on trunnions 35 and 36 and run in said slots 48 in the ball-joint casting. The rollers and trunnions also serve to prevent relative rotary movement between said ball-joint casting and said upper reamer yoke.

Preferably cast integral with the sleeve portion 49 of the upper reamer yoke, are the depending bracket arms 55, clearly illustrated in Figs. 4, 5, 6, 12 and 13, and at the lower end the said depending arms merge with the reamer motor inclosing and supporting frame 56.

Complementary to the upper reamer yoke is a lower reamer yoke, which comprises a motor supporting frame 57, bracket arms 63 depending therefrom and a sleeve 64, with which the lower ends of said arms merge. The upper portion of said lower yoke forms the reamer motor supporting frame 57, which is substantially like that at the bottom of the upper reamer yoke, both upper and lower reamer motor supporting frames being shown as having angular cross section and horizontal flanges which are of substantially the same contour and are secured together by bolts. In said horizontal flanges are semi-cylindrical bearing portions, which, when the flanges are bolted together as set forth, form bearings for trunnions 58 extending from the sides of the casing of the reamer motor 59, thereby suitably supporting said motor, the upper and lower reamer yokes forming a divisible motor-supporting frame, as is obvious from the drawings.

To more securely unite the upper and lower reamer yokes, perforated lugs 60 and 61 extend from the former and latter, respectively, and are joined together by suitable means, as properly retained pins 62. Converging as they extend downwardly are the bracket arms 63 depending from the reamer motor supporting frame of the lower reamer yoke, said bracket arms being united at their lower extremities by the sleeve 64. Extending inwardly from bracket arms 63, are steadying and positioning lugs 175, which hold the reamer motor 59 from any tendency to oscillate and thereby impart vibration to the reaming machine.

Threaded into the said bottom sleeve 64, is a bushing 65, indicated in Figs. 4 and 5 and well shown in Fig. 26, said bushing having a centrally threaded bore into which is screwed a post, which post is preferably in the form of a pipe, said pipe post 66, bushing 65 and sleeve 64 being maintained in permanent relation by the set screw 67 shown in Fig. 26.

Referring to Figs. 1 and 14 particularly, pipe post 66 extends downwardly a proper distance to bring the lower portions of the reaming machine into suitable juxtaposition to the work to be treated. At its lower extremity a nut 67 is threaded onto the lower end of pipe post 66, said nut having an internal smooth bore adapted to serve as a bearing for the lower solid end 68 of the reamer spindle.

Figs. 14 and 26 disclose the type of reamer spindle which is employed in the form of reaming machine serving as a disclosure for this invention, it being clear that the upper end of the lower solid portion 68 of the reamer spindle is reduced in cross section to fit within a pipe 69, constituting the major portion of said reamer spindle, as clearly seen in Fig. 14. Consulting Fig. 26, the upper end of pipe 69 of the reamer spindle is shown to receive a reduced lower end of the upper solid portion 70 of the reamer spindle, said reduced portion terminating in its upper part in a non-annular enlargement 71, fitting into a correspondingly shaped recess in the bottom of the reamer motor spindle 72, and terminating in a shank 73 extending into said reamer motor spindle. A nut 74 is screwed onto the exterior of the projecting portion of the reamer motor spindle to hold the reamer spindle in position, and which nut, of course, is removable to permit the withdrawal or changing of reamer spindles. Due to the formation of the non-annular enlargement 71 and the correspondingly shaped recess which accommodates it, upon rotation of the reamer motor spindle, the reamer spindle is caused to revolve. The mechanical connection between the upper and lower solid portions 70 and 68 respectively, of the reamer spindle, to the pipe portion 69 may easily be made by welding these parts together.

The lower solid portion 68 of the reamer spindle has a considerable length extending below its pipe inclosed reduced portion, a portion of which telescopes within a reamer extension member 75. The latter partakes in general of the nature of a hollow cylinder, internally closed by a web intermediate its upper and lower extremities, forming an upper pocket for the reception of the solid reamer portion 68, and a lower pocket for a tapered sleeve 76, in this case a Morse tapered sleeve. The upper end of the reamer extension member is tapered as at 77, and split as shown in Figs. 24 and 25, to form spring gripping members, and below the tapered portion is a screw-threaded sub-division 78, adapted to receive a nut 79, and which when screwed into place causes the split portions to firmly grip the solid portion 68 of the reamer spindle, preventing longitudinal sliding of the reamer extension member upon said reamer spindle. As it is desirable to apply considerable pressure to effect the binding of these parts, both the nut 79 and the reamer extension 75 are provided with hexagonal formations for the application of wrenches.

The clamping just described is not intended for driving purposes, which is accomplished by a key 80, shown in Fig. 23, which is inserted in an opening in the screw-threaded sub-division 78 of the reamer extension member, the key being threaded to complete the convolutions of the threads in that portion of the reamer extension member and being forced into place by a driving fit. Said key 80, extends into a key-way 81 in the lower solid portion 68 of the reamer extension, as shown in Figs. 14 and 23, insuring the turning of the reamer extension member when the reamer spindle revolves.

As the height of the key is co-extensive with the height of the threaded portion 78 of the reamer extension member, and the key-way is of considerable length, said reamer extension may be slid up and down a considerable distance, shortening or lengthening in effect the reamer spindle and is then fixed in position by the tightening of nut 79.

The tapered sleeve 76, which is inserted into the lower pocket, has projections 82 which occupy conforming recesses in the bottom of said reamer extension member, whereby when the reamer extension member is rotated in response to impulses from the reamer spindle, the said tapered sleeve 76 will rotate with the reamer extension member. The lower end of the reamer extension member is also threaded to receive a nut 126, which holds the tapered sleeve securely in place. The shank of a chuck 83 may at will be forced into the tapered sleeve, and, as is usual, has a tang 84 which projects into a slot in the top of the tapered sleeve and insures a positive drive of said chuck 83. Any desired reamer bit may then be inserted into the chuck after the common practice.

Considering Figs. 1, 14 and 21, a hand wheel 85 is shown, which is grasped by the operator while he is manipulating the reaming machine. By the use of this hand wheel he directs the point of the reamer bit to any desired hole, and upon the hand wheel is mounted an operating handle for actuating air valve 42 and a switch for controlling the racking motor 13, which moves the traveler to bring the reamer bit to substantially the longitudinal location of the hole to be reamed.

The valve operating handle is fulcrumed in lugs 86 upon one of the spokes of said hand wheel, and comprises a hand grip 87, conformate with the curvature of the rim of the hand wheel by preference, and having a rearwardly extending arm 88, as best seen in Figs. 20 and 21, which at its inner end branches and extends upwardly to embrace the outer faces of said fulcrumed legs 86. From the point of fulcruming another lever arm extends rearwardly and upwardly and is bifurcated to have legs 89 carrying at their inner ends studs 90, which studs project into an annular groove 91 in the bottom of switch cage 92. The lower end of said switch cage incloses and rides upon a hand wheel sleeve 93, which is screwed to a flange on the hub of the hand wheel 85.

When the operator grasps grip 87 of the valve operating lever and the juxtaposed portion of the hand wheel rim and partially draws the hand grip toward said wheel rim, the bifurcated legs or arms 89 of the other lever arm of the operating handle draws said switch cage 92 downwardly against the action of a spring to be presently referred to, and when he releases said hand grip 87, said spring causes the switch cage to move upwardly.

The top of the switch cage as shown in Figs. 1, 14, 20 and 30 is provided with a neck 94 which embraces the pipe post 66 in a sliding engagement, and extending from the neck 94 are diametrically opposed spaced lugs 95. Pivoted about pins supported in said lugs 95, are adjustable connection eyes best illustrated in Fig. 30. These eyes comprise internally threaded cylinders 96 adapted to receive threaded eyes 97, to which are attached chain portions 98, which, upon rising to a proper height merge into a single chain 99, the upper end of which is secured to a similarly threaded eye 100 which is screwed into a clevis 101, said clevis being pivoted to a valve lever 102 mounted on the stem of valve 42.

Lever 102 is a double armed lever and has attached to its opposite end a helical spring 103. The lower end of said spring being secured to the upstanding flange of the upper reamer yoke supporting frame 56 as is clearly illustrated in Fig. 12.

It is therefore apparent that when the operator draws the grip handle 87 upwardly toward the rim of the hand wheel 85, pulling down the switch cage 92, through the chains 98 and 99, he partially revolves lever 102, actuating the air valve 42. Upon such a release as previously referred to of grip handle 87, spring 103, attached to lever 102 causes said lever 102 to return to its original position. That the lever 102 may not go beyond said initial position, a lever restraining chain 104, having its lower end also secured to the upright flange, as shown in Fig. 12, of the upper reamer yoke supporting frame 56, is attached to a screw eye 105, this being best shown in Fig. 30, threaded into a clevis 106 and terminates the return movement of the lever 102 when the proper alinement of the valve and its ports for the initial position of the lever is obtained.

The use of the chain devices which connect chains 98 to the switch cage 92, and that which connects chain 99 to valve lever 102, and also that which connects lever-restraining chain 104 to said lever 102, through the screw threaded eyes 97, 100 and 105, permits a fine adjustment between the switch cage 92 and said air valve lever 102, enabling a very accurate setting of the valve member 107 inside of air valve 42.

When lever 102 is in what has been termed its initial position, air is being admitted to the air cylinder 25, causing the piston within cylinder 25 to rise to its uppermost position, carrying up with it piston rod 31 and cross head 34. As the cylindrical portion 49 of the upper reamer yoke is caused to move with cross head 34 by reason of the connection of its trunnions therewith, as previously described, said upper reamer yoke, the lower reamer yoke secured thereto and the reamer motor supported by both yokes, the pipe post and all the parts of the reaming machine supported and carried by the pipe post, which parts include all of the elements in the lower part of the reaming machine, are raised to their uppermost positions and so held by the fluid pressure exerted on the underside of the piston. The parts when so held, are in their out-of-use position, and the valve 42 has its parts disposed as illustrated in Figs. 9 to 11 inclusive.

As seen in Figs. 8 and 9, the valve proper 107 is of the ground tapered type and contains a valve pocket 108 of considerable width, narrowest toward the center of the valve and expanding angularly as it approaches the upper circumferential surface of said valve. Communicating with the narrowest innermost portion of pocket 108, and extending to the under portion of the cylindrical surface of the valve 107 are passages 109, two such passages being shown in Figs. 8 and 11, whereby a sufficient area is provided for the inflow from pipe 43, through ports 111 in the valve housing 112 of a large amount of air.

Fig. 9 discloses one each of the passages 109 and ports 111, and also port 110 which is in the valve housing and has a width corresponding to that of pocket 108, which port 110 communicates by pipe 41 to the drilled hole 37 in cross head 34, as shown in Fig. 6, passing by drilled hole 38 into the tubular piston 31 and entering the space in the air cylinder underneath the piston through hole 39 just below said piston. Therefore, while air valve 42 is in this condition, air pressure is continuously supplied from its source to keep the piston in the air cylinder up, and thereby holding the movable parts, previously enumerated, of the reaming machine in their highest positions.

When, however, the operator has pushed the hand wheel so as to carry the reamer bit to another hole within the zone that does not require a movement of the trolley or traveler, or both, by pulling upwardly on the hand grip 87 of the valve operating handle until the same has moved about, say, one half its arcuate stroke, the bifurcated arms 89, also parts of the valve operating lever, through the studs 90 engaging annular recesses 91 in the switch cage 92, causes said switch cage to move down through part of its possible travel. The chains 98 and 99, shown in Fig. 30 and which are attached to the chain lugs 95 at the top of the switch cage 92, are pulled down by the downward travel of the said switch cage, causing the actuating lever 102 for air valve 42 to revolve through a portion of its possible rotary movement.

The operator is accustomed to give such a movement to hand grip 87 of the operating handle that the ports 109 will move in a counter-clock-wise direction, as viewed in Fig. 9, shutting off communication between port 111 in the bottom of the valve housing 112 and the pocket 108 in the valve 107. But this partial rotary movement of valve 107 brings an elongated passage 113, shown in Figs. 8, 10 and 11, in the upper surface of valve 107 into alinement with a pair of exhaust ports 114, shown in dotted lines to the left of pipe 41 in Fig. 8, and one being shown in full lines in Fig. 10. Said passage 113, in the valve 107 then establishes communication between pocket 108 and said ports 114 in the top of the valve housing 112, and due to the circumferential length of valve pocket 108 this communication is extended in the opposite direction through pipe 41, as seen in Fig. 6, through drilled holes 37 and 38, the interior of piston rod 31, and by hole 39 to the interior of the air cylinder 25.

The air in said cylinder 25 is therefore rapidly exhausted through hole 39, tubular piston rod 31, cross head 34, pipe 41, and as seen in Figs. 8, 10 and 11, through valve housing port 110, passage 113, in the top of the valve 107 and out to atmosphere through the exhaust ports 114 in the valve housing 112. With the rapid exit of the air from the air cylinder, the piston under the influence of the weight of the parts which are connected therewith, moves rapidly downwardly, as does the piston rod 31, cross head 34, the upper and lower reamer yokes, pipe post and all of the parts disposed therebelow, which includes the reamer bit. As the reamer bit approaches the hole it is about to ream, the operator pulls hand grip 87 of the valve operating lever, fulcrumed on the hand wheel, upwardly the rest of its possible travel, still further pulling down switch cage 92.

Said switch cage thereupon draws chains 98 and 99, as best shown in Figs. 12 and 30, further downwardly, swinging the valve lever 102 of valve 42 still further about its axis, so that the valve 107 is further rotated in a counter-clock wise direction. Passage 113 in the top of valve 107 is then moved out of alinement with the exhaust ports 114 in the top of the valve housing 112, so that it no longer affords a means of communication with those exhaust ports. But a saw-cut 115 in valve 107, which communicates with the passage 113 comes into alinement with one of the exhaust ports 114 in valve housing 112. Therefore, because of the registration of saw-cut 115 with one of the exhaust ports 114, communication between the said exhaust ports 114 and the interior of the air cylinder 25 is not entirely shut off, but the escape of the air is greatly diminished and the further downward advance of the parts, including the reamer bit is at a rate of speed best adapted to reaming purposes.

Difficulty is frequently experienced in keeping air valves tight, and to avoid any leakage of air through the valve, which would result in permitting undesirable movement of the piston and consequently the parts whose positions are controlled thereby, special care is taken to prevent any such leakage in valve 42. A valve cap 130 is screwed onto the outer end of the valve housing 112 and is of such form as to contain a chamber in which is located a spring 131, which bears against the inner vertical wall of said cap 130 and against the shoulder of valve 107, said spring 131 surrounding a stem 132 of the valve 107. Stem 132 projects through cap 130 and therebeyond, and slipped over it is a washer 133, which is pressed by a nut 134 against the outer vertical face of cap 130. Sufficient pressure from jam nut 134 will cause washer 133 to completely seal any points of egress for the air and keep the same fully confined within valve 42. As, in service, constant actuation of the valve may tend, after a period, to disarrange the adjustment of the jam nut 134, a lock nut 135 is provided, which normally keeps jam nut 134 from displacement, but in case of which, may be backed away from the jam nut 134 until a new adjustment of said jam nut 134 is made, again causing washer 133 to seal the valve, whereupon lock nut 135 once more holds the jam nut 134 properly in place.

It being necessary that the reamer bit revolve to perform the reaming operation, means have been provided whereby the reamer motor will have its circuit closed and begin to impart rotary motion to the reamer bit. That the operator may not be called upon to exercise his judgment as to when to begin or to cease the running of the reamer motor, a make-and-break switch is mounted upon the cylindrical portion 49 of the upper reamer yoke, the location of this make-and-break switch being shown in Figs. 4, 5, 27, 28 and 29, its details being disclosed in the last three figures.

Best seen in Figs. 27 and 28, a slot 116 is formed in the cylindrical portion 49 of the upper reamer yoke, into the lower portion of which slot projects a contact roller 117, mounted in a plunger 118, a part of which plunger is inclosed in what is shown as a square casing 119, though it may have other form, and projecting through the rear end thereof and forming a binding post 120, a spring 121 within square casing 119 backing said plunger and normally causing said roller 117 to extend outwardly. Said square casing 119 is inclosed by an insulating casing 128, this casing being forced into the wall of the lower cylindrical portion 24 of the ball-joint casting by a driving fit, and thoroughly insulating the contact roller device from that casing.

Because of slot 116, the upper reamer yoke cylindrical portion 49 and all of the movable parts are capable of moving downwardly without interference by said contact roller device. Attached to a raised slot-outlining portion of the cylindrical portion of the upper reamer yoke is a cover 122 secured to the cylindrical portion 49 of the upper reamer yoke by screws 129, and secured to this cover 122 by screws 123 is an insulating block 124. In turn secured by countersunk head bolts 127, to the insulating block, is a contact strip 125 of less length than the travel of the movable parts, including the cylindrical portion 49 of the upper reamer yoke. As, in consequence of exhausting the air in the air cylinder 25, said cylindrical portion 49 of the upper reamer yoke moves downwardly, it carries with it the insulated strip 125, so that shortly after the beginning of the downward movement of said cylindrical portion 49 of the upper reamer yoke, engagement is made between contact strip 125 and roller 117 causing the circuit in which the reamer motor is included to be closed, as will be more fully shown in a diagrammatic way hereinafter. For the present it is sufficient to say that the circuit is closed and that the motor begins to operate and that operation is carried on throughout the downward movement of the cylindrical portion 49 of the upper reamer yoke and the rest of the movable reamer parts throughout most of the continuance of their downward travel. But before they quite complete their downward travel, the upper end of contact strip 125 passes below and away from contact roller 117 of the contact plunger device, breaking the circuit and causing the reamer motor to become inoperative.

When the air valve 42 is again operated to admit air into the air cylinder 25, thereby causing the piston in that cylinder to draw up those parts susceptible to upward travel, a reverse action between the contact strip 125 and contact roller 117 takes place, and the motor again revolves until the contact strip 125 and contact roller 117 again assume the position shown in Fig. 27, whereupon the motor is once more stopped and so remains until another hole is to be reamed.

While operating, the motor sets up a considerable torque, which tends to give rotary movement to the hemispherical portion of the ball-joint casting and the parts of the reaming machine which are suspended therebelow by the reaction through said parts. Means to obviate the danger of this is provided; and comprises a plurality of lugs 136, extending outwardly from the cup-shaped socket portion 18 of the trolley casting, and chains 137 secured to eye bolts in the ends of said lugs 136 at one end, and at the other end secured to eye bolts screwed into the ball-joint casting intermediate the hemispherical portion 23 and the lower cylindrical portion 124. Said chains 137 are installed so as to have a small degree of slackness so that the hemispherical portion 23 of the ball-joint casting may freely oscillate within the cup-shaped portion 18 of the trolley casting 16, but which slack may quickly be taken up and prevent any more than a very slight initial rotation of the said ball-joint casting within the trolley casting.

The chain lugs 136 perform another function in that some of them extend underneath the channels 6 of the traveler 5 and prevent the wheels 21 of the trolley from ever accidentally jumping off the upper flanges of said channels 16, which constitute the track upon which they run.

While the depending portion of the reaming machine may be oscillated within a certain zone to reach various holes therein, occasions arise when the reaming tool must be carried to another portion of the piece of work, particularly when it is lengthy and wide as is the underframe of a railway car. So far as the operator is concerned, to accomplish such a change of position it is but necessary for him to press either one of two buttons in the racking motor switch, if it is necessary to move the traveler 5, which switch is shown at 138 in Figs. 21 and 22, and is inclosed in a switch-box 139 formed as an intergral part of the rim of hand wheel 85.

Pressing one button causes the traveler composed of channels 6 and 7 to move in one direction, and pressing the other button, to move in the opposite direction. The longitudinal position of any hole to be reamed may be located by this means. To secure the transverse location, the operator simply pushes against the pipe post 66, and because of the easy running of the wheels 21 of the trolley 16, upon the channels 6 of the traveler, the reaming machine will be carried transversely over the work until the operator ceases pushing. Also due to the easy movement of the trolley, when it is necessary to incline the suspended reamer machine parts, as indicated by dot and dash lines in Fig. 1, to reach a hole within the zone the reamer bit is then located in, and the reamer bit has been started into said hole, the reaction through the reamer parts will cause the trolley of itself to automatically travel to bring the reamer parts vertical, and the hole to be reamed will be perfectly perpendicular to the work.

Referring again to hand wheel 85, (see Figs. 14 and 20) the latter is revoluble, so that the valve operating lever and the racking motor switch may be carried around by hand to any position the operator may change to, rendering it unnecessary to have more than one of each of these devices upon the hand wheel. That this may be so, a hand wheel collar 140, is secured to pipe post 66 by set screws 141, and has an upper portion of enlarged diameter, recessed to receive the hub 142 of the hand wheel 85. Said hub 142 of the hand wheel contains in its lower portion an annular groove 143, into which project set screws 144 threaded into the hand wheel collar 140. Said screws 144 prevent any vertical displacement of the hand wheel, but allow it to turn freely under the influence of the operator's hand as he walks about from one position to another.

It is of course necessary to carry electrical wiring to the reamer motor 59, the make-and-break switch mounted upon the cylindrical portion 49 of the upper reamer yoke and to the racking motor switch 138 on the hand wheel, and also to a controller box 145 mounted on the outer face of the traveler channel 6, shown in Figs. 1 and 2, on the same side of said traveler as racking motor 13, and to a magnetic switch box 146 adjacent the controller box 145, as well as to contact rollers 147 which collect current for the entire electrical wiring of the machine from contact strips 148. Said contact strips 148 are mounted upon an insulating strip 149 carried by the web of the I beam, forming the inner surface of one of the box girders 3, and said contact strips 148 and insulating strip 149 are co-extensive with that length of the overhead car building structure which is allotted to the work to be performed.

Considering the mechanical arrangement of the wiring to the various electrical devices just enumerated, and consulting Figs. 1 and 2, cables 150 run from the controller and magnetic switch boxes 145 and 146 along the outer surface of the channel 6 of the traveler which supports said boxes, to and through one of the end channels 7, the left hand one in Figs. 1 and 2, one of said cables going to said current collecting contact roller devices 147, and the others running along the face of said end channel 7 of the traveler, again through the same and along the outer face of the opposite traveler channel 6, being bound to the air piping 45, to the central portion of the last mentioned traveler channel 6, here being bound to air hose 44 and progressing with it to the piping 43 which leads to the inlet side of air valve 42, as shown in Figs. 4 and 12.

Considering Fig. 5 in connection with Figs. 4 and 12, it will be seen in Fig. 4 that one of the cables, designated from this point as 151 runs up alongside the cover 122 of the make-and-break switch, to and into the ball-joint casting at the enlarged portion intermediate the hemispherical and cylindrical portions 23 and 24 respectively.

As indicated in Fig. 27, cable 151 runs down inside of the cylindrical portion 24 of the ball-joint casting toward binding post 120, and one of its wires 154 is connected to said binding post 120, and another of its wires 152 is brought out of the cable shortly after it passes beyond piping 43 at the inlet side of valve 42, as seen in Fig. 4, and runs to a binding post 153 which extends inwardly to contact strip 125 of the make-and-break switch, serving to hold said contact strip to its insulating block 124, as do bolts 127. The actual electrical circuit will be better disclosed diagrammatically later on.

Reverting to Figs. 4 and 12, another cable 155 passes through the bracket arm 55 of the upper reamer yoke and down to a plug and socket 156, and emerging from the plug portion thereof, runs to the reamer motor 59. A third cable 157 extends, as seen in Figs. 4, 5 and 12, from adjacent the piping 43 to the other leg 55 of the upper reamer yoke, through a flange thereof and down to a plug and socket 158, and from the plug portion of said socket, down one leg 63 of the lower reamer yoke and into a pipe conduit 159.

As seen in Figs. 1 and 14, pipe conduit runs to and into switch cage 92, the cable 157 emerging therefrom with its three wires divided and going to three contact rings 160, 161 and 162. These contact rings are shown in Fig. 14, in section at the right and in dotted lines at the left, to be mounted upon an insulating sleeve 163, and brushes 164, 165 and 166 bear against said contact rings and are supported upon another insulating sleeve 167, set into an annular recess in the upper portion of the hand wheel sleeve 93. Said insulating sleeve 167 is secured to the hand wheel sleeve 93 by screws 171, firmly retaining it in place. A portion of the insulating sleeve 167, carried by the hand wheel sleeve, is shown in Fig. 18, and in Fig. 17 the contact brushes 164, 165 and 166 are shown in plan, one of them bearing against the uppermost contact ring 160.

Three conductors 169 are secured to the said contact brushes 164, 165 and 166, one to each brush, and pass down through long holes 168 in the semi-cylindrical ribs vertically formed internally on the hand wheel sleeve 93, as best shown in Figs. 14 and 18. Emerging from the lower end of the hand wheel sleeve 93, one of the conductors 169, seen in Fig. 14, passes into a spoke of the hand wheel 85, and the other conductors 169 pass into spokes on the opposite sides of the first mentioned spoke, through apertures therein, and in the first mentioned spoke, all three conductors now traversing the first mentioned spoke, as seen in Figs. 19 and 21, over a bridge 170, which supports them, into the rim of the hand wheel 85. As seen in Fig. 21, the conductors 169 pass through the rim of the hand wheel, to the racking motor switch 138, the actual electrical circuits to be later better disclosed.

The plug and socket devices supported upon the arms 55 of the upper reamer yoke, permit a mechanical rupture of the wiring that runs to reamer motor 59 and racking motor switch 138 in the hand wheel, when it is desired to disassemble the suspended parts of the reaming machine.

The pipe conduit 159 is secured to the pipe post 66 intermediate the lower reamer yoke and the switch cage by clamps or brackets 172, fastened to pipe post 66 by set screws or other means, and to prevent disruption or tangling of the wires of cable 157, the switch cage is prevented from rotating about the pipe post 66 by set screws 173, threaded into the neck 94 of said switch cage, and extending into slots 174 in the pipe post, said slots being located within the switch cage 92 and are of sufficient length to permit of free up and down travel of said switch cage, as best seen in Figs. 14 and 16.

Referring again to the current collecting contact rollers 147, and inspecting Figs. 31 to 33 inclusive, said contact rollers 147 are each supported in a plunger 176, which extends into an elongated bracket 177, the contour of the plunger 176 and the recess in the bracket 177 conforming to each other that the plungers 176 may be properly guided. Each plunger 176 is spring pressed by a coil spring or other device 178, which normally presses the contact rollers 147 against the current supplying strips 148.

The plunger brackets have their recesses open substantially throughout their outwardly directed faces, except for a backing wall for the springs 178, and said recesses are closed by cover plates 179, held in place by screws passing therethrough and entering the plunger brackets 177. Both of the plunger brackets are mounted on an insulating block 180, which in turn is secured by bolts to the lower end of a depending sheet metal or other bracket 181, carried by the traveler 5, and the wires from the cable which lead to the current collecting roller contact devices are conveniently secured, one to each of them.

To use the reaming machine, the main switch M shown in Fig. 34 is first closed, and current flows from the positive side of said main switch to the positive current supply strip 148, to the positive current collecting roller 147, by conductor B, through a fuse C, and by conductor D, in which is located another fuse E, to the positive side of starting resistance SR, through all of the same, and by conductor G to the actuating coil H of interlocking relay H', to resistance Y, and by conductor J to point J', by conductors $J^2$ and $J^3$, through a fuse $J^4$, to conductor $J^5$, through another fuse $J^6$, and by conductor $J^7$ to the negative contact roller 147, and by the negative contact strip 148 to the negative side of the main switch M.

Interlocking relay actuating coil H is thereupon energized, causing the bridging contact K to connect terminals LL.

If the operator now desires to move the reaming machine longitudinally of the work, in what may be termed a forward direction, he turns his attention to the racking motor switch 138, which is located upon the hand wheel 85. Said racking motor switch 138 is of the double switch type, and contains push button switches F and R. To effect said forward movement of the traveler, comprising channels 6 and 7, he closes switch F, whereupon current flows from the positive side of main switch M, to positive current supply strip 148, to positive contact roller 147, by conductor B, fuse C, conductor D, fuse D', conductor $D^2$, to contact ring 162, which is located within the switch cage, and by brush 166, and conductor $D^3$ to one side of switch F, through said switch, and by conductor $F^1$, to brush 164, another ring 161, conductor $F^2$, to points $F^3$ and $F^4$, here dividing and going through the actuating coils $F^5$ and $F^6$ of reversing switches $1^a$ and $3^a$, and continuing by conductor $F^7$, which is connected to the opposite ends of said actuating coils $F^5$ and $F^6$ and runs to point N, where the circuit branches, going through small portions of two resistances UU, and by conductor $F^8$ to one contact L, through bridging contact K, to the other contact L, to point O, to point P, by conductor J, to point J', thence by conductors $J^2$ and $J^3$, to fuse $J^4$, conductor $J^5$, to fuse $J^6$, conductor $J^7$, to the negative side of main switch M. Actuating coils $F^5$ and $F^6$ of reversing switches $1^a$ and $3^a$ now operate to close the latter switches.

As a result, the current comes from the positive side of the main switch M, to positive supply strip 148, to positive contact roller 147, and by conductor B, fuse C, conductor D, fuse E, remainder of conductor D, to the positive side of the starting resistance SR, through said resistance, and by conductor $D^4$, to the actuating coil C' of controller switch $1^b$, by conductor $D^6$, to the racking motor series field $A^3$, and by conductor $D^7$, to and through the now closed reversing switch $3^a$, by conductor Q to contact Q' of open reversing switch $2^a$ and by conductor $Q^2$ to the armature A' of the racking motor 13, by conductor $A^2$, to contact S of opened reversing switch $4^a$, by conductor S' to contact $S^2$ of closed reversing switch $1^a$, through said switch and by conductor $J^3$, to fuse $J^4$, by conductor $J^5$, fuse $J^6$, conductor $J^7$, to negative contact roller 147, and by negative contact strip 148, to the negative side of main switch M. The racking motor 13 thereupon is started with all of the starting resistance SR in circuit.

The hereinbefore mentioned controller switch $1^b$, which is included in the circuit last traced, is of a magnetic type, and for a short time is magnetically restrained from closing, but as the motor speeds up, the current passing through its actuating coil C', and which initially possessed a considerable overload value, is diminished to its normal value and controller switch $1^b$ closes.

Upon said closure of controller switch $1^b$, current flows from the positive side of the main switch M, to positive supply strip 148, positive contact roller 147, conductor B, fuse C, conductor D, fuse E, the remainder of conductor D, to and through all of the controller starting resistance SR, to one of the contacts of controller switch $1^b$, the bridging contact therefor, and the core of said controller switch $1^b$, and by conductor T to point T', thence by conductor I', to and through resistance Y, and by conductor J, to point J', by conductors $J^2$ and $J^3$, to fuse $J^4$, by conductor $J^5$ to fuse $J^6$, and conductor $J^7$ to the negative contact roller 147, and thence by negative contact strip 148 to the negative side of main switch M. This causes the short-circuiting of the actuating coil H of the interlocking relay H', and the consequent deënergizing of the said actuating coil H results in bridging contact K of the interlocking relay H' disengaging its contacts LL.

After the throwing out of the interlocking relay H', as just described, current is flowing from the positive side of the main switch M to the positive contact strip 148, positive contact roller 147, conductor B, fuse C, conductor D, fuse D', conductor $D^2$, contact ring 162, brush 166, conductor $D^3$, through switch F, by conductor F', to brush 164, to contact ring 161, and by conductor $F^2$, to points $F^3$ and $F^4$, and to and through the actuating coils $F^5$ and $F^6$ of reversing switches $1^a$ and $3^a$, by conductor $F^7$ to branch point N, here dividing and going through all of the resistances UU, to points O and P, and by conductor J, to point J', thence by conductors $J^2$ and $J^3$ to fuse $J^4$, conductor $J^5$, fuse $J^6$, conductor $J^7$, to negative contact roller 147, and by negative contact strip 148 to the negative side of the main switch M, the said reversing switches $1^a$ and $3^a$ being held closed by the establishment of the just described circuit.

As controller switch $1^b$ had previously closed, the starting resistance SR, between controller switches $1^b$ and $2^b$ became short-circuited, and, in the racking motor circuit, current flowed from the positive side of the main switch M to positive contact strip 48, positive contact roller 147, conductor B, fuse C, conductor D, fuse E, the remainder of conductor D, to the starting resistance SR, through the latter to one contact of controller switch $2^b$, through the actuating coil $C^2$ of said controller switch $2^b$, to the contacts of the now closed controller switch $1^b$, through the actuating coil C' of the latter, by conductor $D^6$, to the racking motor series winding $A^3$, by conductor $D^7$, to and through the now closed reversing switch $3^a$, by conductor Q, to contact Q' of opened reversing switch $2^a$, by conductor $Q^2$ to the armature A' of racking motor 13, by conductor A², to point S of opened reversing switch 4ª, by conductor S' to contact S² of closed reversing switch 1ª, through said latter switch and by conductor J³ to fuse J⁴, by conductor J⁵ to fuse J⁶, by conductor J⁷ to the negative contact roller 147, and by negative contact strip 148, to the negative side of the main switch M.

After a preliminary pause, due to the magnetic character of controller switch 2ᵇ, said switch closes and current in the racking motor circuit flows from the positive side of the main switch M, to positive contact strip 148, positive contact roller 147, by conductor B, fuse C, conductor D, fuse E, the remainder of conductor D, to and through the small amount of resistance SR remaining in the racking motor circuit, through the actuating coil C³ of controller switch 3ᵇ, to the contacts of controller switch 2ᵇ, through the actuating coil of said controller switch, to the contacts of controller switch 1ᵇ, through the actuating coil C' of the last mentioned controller switch, and by conductor D⁶ to and through the motor series field A⁸ of racking motor 13, by conductor D⁷ to and through closed reversing switch 3ª, by conductor Q to contact Q' of opened reversing switch 2ª, by conductor Q² to the armature A' of racking motor 13, by conductor A² to contact S of open reversing switch 4ª, by conductor S' to contact S² of closed reversing switch 1ª, through said switch and by conductor J³ to fuse J⁴, by conductor J⁵ to fuse J⁶, by conductor J⁷ to negative contact roller 147 and by negative contact strip 148 to the negative side of the main switch M.

After being magnetically restrained for a short period of time, controller switch 3ᵇ closes and all of the racking motor controller resistance SR is cut out of the racking motor circuit, and racking motor 13 is operating at full speed and causing the traveler, comprising channels 6 and 7 to move in what has been termed a forward direction. When the suspended parts of the reaming machine have been moved so that the reamer bit is approximately at the longitudinal point where the reaming is to be done, the operator opens switch F of the racking motor switch 138 by taking his finger off the button by which switch F is closed, whereupon there is a resultant opening of the racking motor circuit and the traveler comes to rest.

As the actuating coils F⁵ and F⁶ of reversing switches 1ª and 3ª were in circuit with the said switch F, the opening of the latter switch causes them to become deenergized, whereupon said reversing switches 1ª and 3ª open, and, as the controller switches 1ᵇ, 2ᵇ and 3ᵇ are in circuit with the reversing switches 1ª and 3ª, their actuating coils become dead and said controller switches 1ᵇ, 2ᵇ and 3ᵇ open, leaving the electrical connections as they were before switch F was closed. This means that the main switch M alone is closed and current flows from the positive side thereof to positive contact strip 148, positive contact roller 147, conductor B, fuse C, conductor D, fuse E, remainder of conductor D, to and through all of the starting resistance SR, and by conductor G to the actuating coil H of interlocking relay H', through resistance Y, and by conductor J to point J', and by conductors J² and J³ to fuse J⁴, conductor J⁵, fuse J⁶, conductor J⁷, negative contact roller 147, and by negative contact strip 148 to the negative side of the main switch M. The bridging contact K of interlocking relay H therefore again connects contacts LL, reëstablishing the circuit that was originally formed by the initial throwing in of main switch M before any other operation took place.

To bring the reamer bit to the transverse location of the hole to be reamed, the operator simply pushes on pipe post 66, whereupon the trolley, carrying the suspended parts of the reaming machine, will move transversely of the work, and when the operator ceases his pressure upon pipe post 66, the depending parts of the reaming machine will come to rest, and the reamer bit will be approximately at the location of the hole to be reamed. Any further moving of the reamer bit that may be necessary is accomplished by the operator grasping hand wheel 85, and directing the reamer bit toward said hole.

His next step is to partially actuate hand grip 87 of the valve operating lever, mounted upon one of the spokes of hand wheel 85, stopping it at the point which allows the rapid exhaust of the air from cylinder 25. Thereupon the piston rod 31 and cross head 34 move rapidly downward, allowing the cylindrical portion 49 of the upper reamer yoke to slide downwardly over the lower cylindrical portion 24 of the ball-joint casting, and therefore the lower reamer yoke, attached to the upper reamer yoke, and the parts depending therebelow, including the reamer bit, rapidly descend. As the reamer bit itself approaches the hole, the operator pulls upwardly still further hand grip 87 of the operating lever, mounted on hand wheel 85, and the air valve 42 is further actuated, so that the minimized exhaust, previously described, sets in, and the reamer advances through the rest of its downward stroke, at a proper reaming feed speed.

Shortly after the upper cylindrical portion 49 of the upper reamer yoke begins to descend, contact strip 125 of the make-and-break switch engages contact roller 117 carried by plunger 118. As a result, current flows from the positive side of main switch M to the positive contact strip 148, to positive contact roller 147, by conductor B, to conductor 152, to contact strip 125, roller 117, plunger 118, conductor 154 to the actuating coil $c$ of the magnetic switch MS, and by conductor $c'$ to point $c^2$, by conductor $J^5$, fuse $J^6$, conductor $J^7$, to the negative contact roller 147, and by negative contact strip 148 to the main switch M.

The energization of actuating coil $c$ of the magnetic switch, as just described, causes the magnetic switch MS to close, whereupon current flows from the positive side of the main switch M, to positive contact strip 148, to positive contact roller 147, by conductor B, fuse C, conductor B', fuse X, conductor X' to the reamer motor 59, from thence by conductor $X^2$ to and through the now closed magnetic switch MS, and by conductor $X^3$ to fuse Z, by conductor Z' and conductor $J^5$, fuse $J^6$, conductor $J^7$, to negative contact roller 147, and by negative contact strip 148 to the negative side of main switch M.

The reaming motor therefore begins to operate, driving the reamer bit as it progresses through the hole being reamed. Before the slidable suspended parts of the reaming machine have traveled downwardly their full stroke, the upper end of contact strip 125 of the make-and-break switch disengages contact roller 117, carried by plunger 118, and the circut, affecting the actuating coil $c$, of the magnetic switch, is opened, which results in the opening of the magnetic switch MS, and consequently the circuit of the reamer motor, causing said motor to come to rest.

When the operator permits the actuation of the air valve, to cause the slidable suspended parts to move upwardly, a reverse action takes place, the reamer motor beginning to operate shortly after the upward stroke of said parts begins, and ceasing to operate before the said upward movement is entirely completed, after which the slidable suspended reamer parts are in their normal position.

Desiring to reverse the direction of the movement of the traveler, comprising channels 6 and 7, to carry the portable reaming machine to a hole located in a direction opposite to that the traveler first moved in, switch R of the racking motor switch 138 is closed by the operator, and current flows from the positive side of the main switch M to the positive contact strip 148, positive contact roller 147, conductor B. fuse C, conductor D, fuse D', conductor $D^2$ to contact ring 162 and brush 166, both in the switch cage 92, by conductor $D^3$, to and through switch R, and by conductor R' to brush 165, contact ring 160, conductor $R^2$ to points $R^3$ and $R^4$, here the circuit divides and goes to the actuating coils $R^5$ and $R^6$ of reversing switches $2^a$ and $4^a$, thence going through both of said coils $R^5$ and $R^6$, thence by conductor $F^7$ to branch point N, where it again divides, going through portions of resistances UU, and by conductor $F^8$, to one contact L of interlocking relay H', through bridging contact K, to the other contact L, to points O and P and by conductor J to point J', thence by conductors $J^2$ and $J^3$, fuse $J^4$, conductor $J^5$, fuse $J^6$, conductor $J^7$, to negative contact roller 147 and by negative contact strip 148 to the negative side of main switch M. Reversing switches $2^a$ and $4^a$ therefore have their actuating coils $R^5$ and $R^6$ energized and become closed.

In the circuit of the racking motor 13, the current now flows from the positive side of main switch M to the positive contact strip 148, and by positive contact roller 147, conductor B, fuse C, conductor D, fuse E, the remainder of conductor D, to and through all of the starting resistance SR, through conductor $D^4$, the actuating coil of controller switch $1^b$, and by conductor $D^6$ to the racking motor series field $A^3$, by conductor $D^7$ to now closed reversing switch $4^a$, through the same to contact S, by conductor $A^2$ to the racking motor armature A' through the latter reversely with respect to its former path, by conductor $Q^2$ to contact Q' of now closed reversing switch $2^a$, through said switch and by conductors $J^2$ and $J^3$ to fuse $J^4$, conductor $J^5$, to fuse $J^6$, by conductor $J^7$, to negative contact roller 147 and by negative contact strip 148 to the negative side of main switch M. Racking motor 13 is therefore started in what will be termed, a reverse direction, and with all the starting resistance SR in circuit.

After an initial magnetic restraint, controller switch $1^b$ closes, cutting out the starting resistance between controller switches $1^b$ and $2^b$, and after said controller switch $1^b$ closes, current flows from the positive side of the main switch M, to positive contact strip 148, positive contact roller 147, conductor B, fuse C, conductor D, fuse E, the remainder of conductor D, to and through all the starting resistance SR, to bridge contact of controller switch $1^b$ and the core thereof, and by conductor T, secured to said core, to point T', thence by conductor I'; to resistance Y, through the same and by conductor J to point J', thence by conductors $J^2$ and $J^3$ to fuse $J^4$, and by conductor $J^5$ to fuse $J^6$, continuing by conductor $J^7$ to the negative contact roller 147, and by negative contact strip 148, to the negative side of the main switch M. The actuating coil H of interlocking relay H' is thus short-circuited, whereupon the bridging contact K of said interlocking relay H' disengages contacts LL, short-circuiting the interlocking relay.

But the reversing switches 2ª and 4ª are maintained closed by their now energized actuating coils R⁵ and R⁶, and the starting resistance is cut out step by step, as it was when switch F of the racking motor switch 138 was closed, until the motor is brought up to full speed. When switch R is again opened the motor circuit is also opened, and either switch F or R, included in racking motor switch 138, carried by the hand wheel 85, may be closed again at will, to drive the traveler in the desired direction, as previously set forth.

It is apparent that I have devised a reaming device which not only possesses the advantages hereinbefore set forth, but which holds the reaming motor suspended in a position far enough above the floor line to keep it away from dirt and other foreign particles which tend to work within the reamer motor casing and interfere with the action of the motor, such as the production of undue sparking and other annoying difficulties.

It is also plain that perfect safety has been given to a hitherto very dangerous operation; that the reaming tool is portable and may be carried to any part of a piece of work with great ease, and also that, being relieved from the previous laborious efforts required in such operations, the operator may devote his attention to securing better work. The cost of labor is also very materially reduced, cheapening the cost of production, and with all of the advantages developed throughout the specification goes to produce a highly desirable reaming machine.

While I have described my invention as constituting a reaming machine, it is quite obvious that it may with equal facility be employed as a machine for performing other operations, such as are done by drills, etc., it being only necessary to replace the reaming bit by the proper type of tool, which is usually of a well-known character and obtainable in the open market. Also special tools for unusual operations may be employed in my machine, and it is to be clearly understood that I do not intend to limit the character thereof, but to use it as a machine of any type and for doing any suitable work.

As the specific tool is not of the essence of the invention, it is equally evident that the tool holder may be of any suitable type, and where a tool or reaming tool is referred to, either in the description or claims, it is to be understood that the term chosen is to be considered in its broadest interpretation as including a tool holder and a tool or either of them. The electrical diagram is shown and described merely to illustrate what was found to be convenient when the device was erected for service and may be greatly varied to suit the exigencies of any particular installation.

What I claim is:—

1. In combination in a machine of the class described, a motor, a tool driven thereby, a support for said motor and tool holding the axes of both in parallelism and in fixed relation to the support, and means to carry said elements to any desired location.

2. In combination in a machine of the class described, a motor, a spindle, a tool-holder driven thereby, a positioning means, and a work-reaching device in which said motor is mounted extending away from opposite ends of said motor to be retained by said positioning means and to guide said spindle, respectively.

3. In combination in a machine of the class described, a movable positioning device, a motor movably supported from said device, a tool holder driven by positioning device, a tool holder driven by said motor, and means unattached to the motor for moving said motor and tool holder to and from work.

4. In combination in a machine of the class described, a motor, a tool holder driven thereby, movable positioning means, said motor being movable and supported therefrom and adapted to be moved thereby to different locations, and pneumatic means removed from said motor for moving said motor and tool holder.

5. In combination in a machine of the class described, positioning means for a tool supported from parts suspended from said positioning means, said suspended parts comprising a depending member, a supporting frame slidable thereon, a motor immovably mounted in said frame and a tool holder driven from said motor, and pneumatic means for elevating said suspended parts from work, a tool in said tool holder being adapted to be fed through the latter by gravity.

6. In combination in a machine of the class described, means to variously position a tool with respect to work, parts including a tool holder and driving means for the latter swingingly suspended from said positioning means and pneumatic means for elevating said suspended parts from the work, said suspended parts also adapted to swing, said suspended parts being adapted to feed a tool through the work by gravity.

7. In combination in a machine of the class described, an overhead track having spaced runways, a traveler and a trolley adapted to position a tool-operating mechanism, said traveler comprising wheels resting upon the runways of said track, shafts connecting and mounting wheels on the different runways, a frame supported by said shafts and comprising spaced longitudinal members and end members connected thereto, said longitudinal members of themselves also constituting a wheel-guiding track for said trolley and driving means engaging one of said shafts.

8. In combination in a machine of the class described, spaced track members, a traveler for positioning a tool-operating mechanism, said traveler comprising shafts, wheels mounted on opposite ends thereof and resting upon said track members and a frame supported by said shafts and having spaced non-rail-bearing longitudinal members forming a trolley track, a trolley positioned between said longitudinal members and ridable upon the trolley track and a motor carried by said frame and adapted to drive one of said shafts.

9. In combination in a machine of the class described, a track, a trolley ridable thereon and comprising a socket extending below said track and a rigid tool-operating mechanism supported in said socket and having oscillatory connection with the lower portion of said trolley.

10. In combination in a machine of the class described, an overhead track, a trolley ridable thereon, and a contractible oscillatory tool-actuating mechanism suspended from said trolley comprising a tool holder and rotatable driving means therefor extending therefrom to the upper portion of said mechanism.

11. In combination in a machine of the class described, a track, a trolley movable on said track, and tool-actuating mechanism comprising a portion having a normally vertically immovable joint with said trolley, an associated vertically movable portion including a motor in comparative juxtaposition to said joint and a motor-driven tool.

12. In combination in a machine of the class described, an overhead support, a trolley ridable along the same provided with a socket, and suspended tool-actuating mechanism including a rigid member insertible into said socket from above to extend therebelow and creating therewith a universal joint, another portion of said mechanism being connected with said rigid member below the socket.

13. In combination in a machine of the class described, a movable overhead trolley, a tool-actuating mechanism suspended from said trolley, a member of said mechanism being seated in the trolley and other members thereof being movable, a fluid pressure cylinder movable with said trolley and a piston therein connected to said movable members to elevate them longitudinally of said seated member.

14. In combination in a machine of the class described, an overhead support, a traveler movable thereon, a trolley ridable on said traveler, movable tool-actuating mechanism suspended from said trolley, a fluid pressure cylinder movable with the trolley, a piston therein adapted to elevate said mechanism, and a fluid supply line to said cylinder having flexible connections for permitting movement of said traveler and trolley.

15. In combination in a tool-operating mechanism, a rotatable tool-carrying holder, a rotatable shaft connected therewith, a tubular post in which said shaft is maintained, a guiding handle connected with said tubular post, a power driven motor connected with said shaft, a trolley, and a yielding connection between said trolley and post.

16. In combination in a machine of the class described, an overhead traveler having track forming members, a trolley ridable thereon and provided with a socket portion, a tool-actuating mechanism seated in and supported by the trolley socket portion, and anti-track-jumping means extending from the socket portion of said trolley and cooperating with said track-forming members.

17. In combination in a machine of the class described, a trolley comprising a frame, bearings therein, axles journaled in said bearings, wheels mounted on said axles, there being a socket portion in said frame, and a ball member seated in the socket portion of the trolley frame and extending away therefrom to receive a tool-actuating mechanism slidable thereon.

18. In combination in a machine of the class described, a trolley, a socket therein, a member having a ball portion seated in said socket and an extension from said ball portion, a fluid pressure cylinder movable with said trolley secured to said ball portion, a suspended tool-actuating mechanism slidable upon said extension, a piston within said cylinder and a cross-head slidable along said extension connected to said slidable mechanism, a piston rod connecting the piston and cross-head and a controlled fluid pressure supply conduit leading to said cylinder whereby fluid pressure may cause said piston to actuate said cross-head and slidable mechanism.

19. In combination in a machine of the class described, positioning means, having a socket portion, a member comprising a ball portion rockably seated in said socket portion and an extension, a fluid pressure cylinder secured to said ball portion, a piston in said cylinder, a tool-actuating mechanism slidable along said extension and movable by said piston.

20. In combination in a machine of the class described, a movable positioning device, a depending member universally-jointed therewith, tool-supporting-and-actuating mechanism engaging and slidable along said depending member, a fluid pressure cylinder movable with said positioning device, a piston therein, motion-transmitting means connecting said piston and tool mechanism and means controlling fluid pressure within said cylinder.

21. In combination in a machine of the class described, a positioning device, a guide extending therefrom and universally-jointed therewith, tool-supporting-and-actuating mechanism slidable along said guide, a fluid pressure cylinder movable with said positioning device, a piston therein, motion-transmitting means connecting said piston and tool mechanism and means movable with the latter controlling fluid pressure in said cylinder.

22. In combination in a machine of the class described, a suitably supported guide, a frame adapted to slide along the same, a motor rigidly mounted in said frame, a tool holder adapted to be driven from said motor and means for elevating and lowering said frame, the motor and tool holder.

23. In combination in a machine of the class described, a suitably supported guide, a frame adapted to slide along the same, a motor in said frame, a tool holder adapted to be automatically driven from said motor during the sliding of said frame and means for moving said frame, said parts forming a structure laterally rigid throughout its length adapted to be oscillated at will.

24. In combination in a machine of the class described, a suitably supported guide, a frame adapted to slide along the guide, a motor in said frame, a tool holder adapted to be driven thereby, an electrical circuit for said motor, means for moving said frame and normally open circuit-closing means in the motor circuit adapted to close the same upon relative movement of said guide and frame.

25. In combination in a machine of the class described, a relatively movable guide and frame, a motor in said frame, a tool adapted to be driven by said motor, means for relatively moving said guide and frame, an electrical circuit including said motor, a source of energy and a normally open circuit-closing means, the latter being adapted to maintain said circuit closed during an intermediate period in the relative movement between said guide and frame.

26. In combination in a machine of the class described, a positioning device, a motor-support suspended therefrom, a motor held by said support and unattached to said device, a tool-driving means actuated by said motor and extending materially therebelow and a tool carried thereby.

27. In combination in a machine of the class described, a work-reaching member, a motor-support adapted to be elevated and lowered combined with its upper end portion, a motor held by said motor-support, a tool-holder near the lower end of said member, and motor-operated tool holder-driving means extending from said motor to said tool holder, said parts being incorporated in an inflexible oscillatory arm.

28. In combination in a machine of the class described, an oscillatory mechanism comprising a motor support, a motor, means for carrying a tool remote from said motor, said means being rigid with said support, a tool holder driven from said motor and means for directing said tool to predetermined locations.

29. In combination in a machine of the class described, an oscillatory mechanism comprising a motor supporting means, a motor, means for carrying a tool remote therefrom, a tool holder driven from said motor, means adapted to direct said tool to predetermined locations, said tool being adapted to be advanced through work by said mechanism, and means other than the tool-directing means for withdrawing the tool therefrom and carrying said oscillatory mechanism to a swinging position.

30. In combination in a machine of the class described, a motor support having an upward and downward stroke, a motor carried thereby, a tool holder operatively connected with the motor and movable therewith and means for causing said motor to drive said tool holder during a period beginning after the commencement of said stroke and terminating before the end thereof.

31. In combination in a machine of the class described, a motor support having an upward and downward stroke, a motor carried thereby, a tool holder adapted to be driven from said motor and movable therewith and means for causing said tool holder to rapidly approach work and to change its rate of advance for passage of a tool therethrough including main and supplemental movement-regulating means each effective independently of the other.

32. In combination in a machine of the class described, a motor and a tool holder adapted to be driven thereby and having an advance and a return stroke, means for causing a tool held by said tool holder to approach and to pass through work at relatively different rates of travel and means for causing said motor to drive said tool during a period beginning after the commencement of said strokes and terminating before the ends thereof.

33. In combination in a machine of the class described, a movable motor support, a motor, a tool holder remote from said motor and adapted to be driven thereby, a rigid connection between said motor and tool holder and means independent of said motor enabling an operator to change to different positions to direct a tool held by the tool holder to different points without relinquishing control of said means.

34. In combination in a machine of the class described, a motor, a tool holder adapted to be driven thereby, an upwardly and downwardly movable support for said motor and tool holder and means for elevating and lowering said support, a portion of said means being on said support at a point remote from said motor and said portion also being adapted to be actuated to operate said means by an operator changing to different locations.

35. In combination in a machine of the class described, a motor, a tool holder located away therefrom, means for transmitting motion from the motor to said tool holder, a support for said motor and tool holder, means for directing a tool held by said tool holder to different points and adapted to respond to a position-changing operator, shifting means for said support, and a control for said shifting means so affected by said tool-directing means as to be capable of being constantly presented to the operator 36. In combination in a machine of the class described, an upwardly and downwardly movable support, a motor and a tool supported thereby at different parts of said support, means establishing a driving connection between said separated motor and tool, supplementary means for adjusting the altitude of said tool, means adapted to change the position of said support and tool with respect to work and means adapted to elevate said support or to lower it to cause said tool to pass through work.

37. In combination in a machine of the class described, an upwardly and downwardly movable support, a motor and a tool carried thereby at different locations, means establishing a driving connection between said motor and tool, supplementary tool-position adjusting means, shifting means for changing the position of said support, a connection between the support and the shifting means, permitting oscillation of the former means by which said support and the parts carried thereby may be oscillated and means for raising and lowering said support and tool.

38. In combination in a machine of the class described, a trolley comprising a pocket-forming portion, a portion formed to produce a socket, an antifriction metal lining in the socket, and an oscillatory tool-carrying mechanism provided with a member depending from the trolley and having a ball portion seated in said socket in contact with said lining and also having a portion adapted to oscillate in the trolley pocket portion.

39. In combination in a machine of the class described, an overhead support provided with a socket and attachment means, a depending member comprising an enlarged head seated and rockable in said socket, attachment means and a guide extension, means secured to the attachment means of said overhead support and depending member to limit relative rotary movement between said overhead support and depending member but permitting oscillation of the latter and an oscillatory tool-carrying mechanism slidably secured to said guide extension.

40. In combination in a machine of the class described, an overhead support having a pocket and a socket, a hollow depending member provided with a head rockably seated in said socket and a guide extension having slots, a fluid pressure cylinder secured to said head and adapted to oscillate in said overhead support pocket, a cross-head within said extension slidably engaging said slots, and an oscillatory tool-bearing mechanism connected with said cross-head and slidable on said guide.

41. In combination in a machine of the class described, an overhead support provided with a socket, a hollow depending member having a head seated in said socket and a guide extension provided with slots, a fluid pressure cylinder carried by said head, a piston therein and a cross-head in said guide extension projecting through said slots, a piston rod connecting said piston and cross-head and provided with a conduit communicating with the interior of said cylinder, means for controlling a fluid pressure supply to the conduit of said piston rod and an oscillatory tool-bearing mechanism movable on said guide by said cross-head.

42. In combination in a machine of the class described, an overhead support, a hollow depending member connected therewith and having a guide extension provided with slots, a fluid pressure cylinder secured to said depending member, a piston therein and a cross-head in said guide extension projecting through said slots in anti-friction relation therewith, a piston rod connecting said piston and cross-head and tool-bearing mechanism connected with the latter and slidable on said guide extension.

43. In combination in a machine of the class described, an overhead support, a depending member connected therewith and provided with a guide, a fluid pressure cylinder movable with said trolley, a piston therein, a cross-head slidable along said guide and provided with a passage for a fluid, a piston rod connecting said piston and cross-head and having a conduit communicating with the interior of said cylinder and with the cross-head passage, a controlled fluid supply line to said cross-head passage and tool-bearing mechanism slidably engaging said guide and operable by said cross-head.

44. In combination in a machine of the class described, relatively movable and fixed parts, a fluid pressure cylinder carried by a relatively fixed part, a cross-head slidable on a fixed part and provided with a passage to its exterior, a fluid-conveying piston rod connecting said piston and cross-head and communicating with the interior of said cylinder and said cross-head passage, a controlled fluid supply line to said cross-head passage and a tool borne by parts moved by said cross-head.

45. In combination in a machine of the class described, a supporting and guiding means, a divisible frame slidably engaging the same, a motor caged and supported by said frame, a tool and means connecting said motor and tool in driving relation.

46. In combination in a machine of the class described, a supporting means having a guide extending therefrom, a divisible sliding frame comprising a separable part provided with a guide-engaging portion and a motor-supporting frame portion, another separable portion having a complementary motor-supporting frame portion, motor-steadying means, means uniting the separable portions, a motor and a tool driven thereby.

47. In combination in a machine of the class described, a supporting means having a guide extending therefrom, a motor-supporting frame slidably engaging said guide, a motor, a tool adapted to be driven thereby, fluid pressure means for sliding said motor-frame, a fluid pressure valve and means actuating said valve in a given direction mounted on said motor frame and means extending to an operator for actuating said valve to control said fluid pressure motor frame-sliding means.

48. In combination in a machine of the class described, a motor-supporting frame, a motor, a post secured to and depending from said frame, tool-driving means extending from said motor, and with said post, a tool attached to the remote portion of said tool driving means, means for directing said tool, fluid pressure means for raising and lowering said motor-supporting frame, a valve adapted to control fluid pressure and means for operating said valve from the tool-directing means.

49. In combination in a machine of the class described, a slidable motor-supporting frame, a motor mounted therein, a tubular post secured to said frame and depending therefrom, a spindle operably connected to said motor and extending through said post, a tool carried by said spindle, means for moving the post to direct said tool and means for raising and lowering said frame.

50. In combination in a machine of the class described, a slidable tool-bearing device of considerable length, fluid pressure means for elevating the same, a valve controlling the elevating means, means for actuating the valve, an operating device for the valve-actuating means, the valve and said operating device being mounted on said tool-bearing device remote from each other and means connecting said valve-actuating means and operating device, said means that connect the valve-actuating means and the operating device being adjustable to set said valve.

51. In combination in a machine of the class described, a tool-operating device comprising a motor-supporting frame, a motor, a tubular post depending from said frame, a tool and driving means connecting said motor and tool, means for elevating said tool-operating device, electrically controlled means for shifting the latter, a valve controlling said elevating means, electrical connections on said post in circuit with said motor and electrically controlled means, a cage inclosing said connections and slidable on the post, devices connecting said cage and valve and means for operating the latter by sliding said cage.

52. In combination in a machine of the class described, a tool-operating device having a depending post and a revoluble hand wheel, a projecting sleeve on the latter, means for elevating said device, means for controlling the elevating means, a slidable cage comprising a housing portion, portions embracing said post and sleeve, an annulus and attachment means, means adapted to actuate said controlling means connecting the latter and said cage attachment means, and an operating mechanism carried by the hand wheel and engaging the cage annulus.

53. In combination in a machine of the class described, a tool operating device having a depending post, a revoluble hand wheel secured to said post, a sleeve upstanding from said wheel, electrically propelled shifting means for said tool-operating device, a conduit extending with said post, an electrical connection between said post and sleeve insulated from and permitting relative movement between both, a switch on said hand wheel and wiring from said shifting means passing through said conduit to said electrical connection and to said switch.

54. In combination in a machine of the class described, a tool-operating device having a post, a rotatable member mounted on the latter, an electrical connection between said post and rotatable member comprising contact members carried by said post insulated therefrom and from each other and current-taking devices carried by said rotatable member insulated from the latter and each other and each engaging one of said contact members and being relatively movable therewith.

55. In combination in a tool operating device, electrical means affecting the same, said device having a post, a revoluble tool-directing device mounted thereon, a sleeve carried by said tool-directing device and comprising a tubular portion containing conduits and an insulation retaining socket, and means for attaching said sleeve to said tool-directing device, an insulating sleeve held in said socket, current-carrying devices attached thereto, electrical connections between said electrical means and current-carrying devices, an electric switch on said tool-directing device and wiring from said current-carrying devices passing through said sleeve conduits to said switch.

56. In combination in a machine of the class described, a tool-operating device, electrical means affecting the same, said device having a post, a revoluble hand wheel mounted on said post, there being a switch pocket carried by said wheel, a switch in said pocket, and electrical conductors from said electrical means passing to said switch.

57. In combination in a machine of the class described, a motor-supporting frame, a motor, a tubular post depending from said frame, a spindle connected to said motor and extending through and beyond said post, a lower guide for said spindle and an adjustable tool-carrying spindle extension secured to said spindle.

58. In combination in a machine of the class described, a motor-supporting frame, a motor, a spindle connected to said motor and extending therefrom, and a spindle extension slidable over the end of the spindle remote from said motor and comprising a shell forming a telescopic pocket for said spindle end and a sleeve-receiving-pocket, an internally tapered sleeve in the latter adapted to retain and drive a tool-holding device, means for retaining said sleeve and means for securing said spindle extension to said spindle at desired locations.

59. In combination in a machine of the class described, a motor-supporting frame, a motor, a spindle connected therewith and extending therefrom and provided with a keyway, and a spindle extension slidable on the spindle adjacent said keyway and comprising a shell forming a telescopic pocket for the remote end of said spindle and a pocket for a suitably retained tool-holding device, a driving key projected through the wall of said telescopic pocket and entering said keyway, a threaded portion on said telescopic pocket portion, clamping members extending from the latter and threaded means coöperating with said threaded portion to cause said clamping members to grip said spindle at desired places.

60. In combination in a machine of the class described, a driven spindle having a keyway, a slidable spindle extension adapted to support a tool and comprising a shell forming a telescopic pocket for the keyway-containing portion of said spindle, a driving key projected through the wall of said pocket and into said keyway and means for retaining said key and for clamping said spindle extension to said spindle.

61. In combination in a machine of the class described, a driven spindle having a keyway, a slidable spindle extension adapted to support a tool and having a wall forming a telescopic pocket for the keyway-containing portion of said spindle, a threaded portion on said pocket-forming wall apertured for a key, a key projected therethrough and into said keyway clamping means on said spindle extension and means for retaining said key and causing said clamping means to grip said spindle.

62. In combination in a machine of the class described, a trolley, a depending member connected therewith and having a hollow guide extension provided with slots, raising and lowering means movable with said trolley, a cross-head within said guide extension connected with said raising and lowering means and provided with trunnions extending through and beyond said slots, a sleeve of a tool-operating device slidable on said guide extension and slotted to receive said trunnions, clamps interlocking with said sleeve to maintain the latter connected with said trunnions.

63. In combination in a machine of the class described, a support movable upwardly and downwardly, a motor and a tool holder driven by the motor carried thereby, a tool secured to said holder, fluid pressure means for actuating said support, and a valve controlling fluid pressure in said actuating means and being provided with ports and passages, means for registering some of said ports and passages to cause said fluid pressure actuating means to raise said support rapidly, said means for registering being operable to differently register some of said ports and passages to control said fluid-pressure actuating means to cause said support to become lowered rapidly for a part of its down stroke and at a different rate of travel during that part of its down stroke that feeds said tool through work.

64. In combination in a machine of the class described, a movable support, a motor and a connected tool holder carried thereby said support being adapted to be raised and lowered, fluid pressure actuating means for said support, and a valve controlling fluid pressure in said actuating means and comprising a valve housing provided with a relatively large inlet port, also having an outlet port of large capacity communicating with said actuating means and being provided with an exhaust port of changeable capacity and a valve provided with a relatively large inlet passage, also having a combined inlet and exhaust pocket and an exhaust passage, registration of said inlet port, inlet passage, pocket and outlet port causing said actuating means to raise said support rapidly, and registration of said outlet port, pocket, exhaust passage and exhaust port resulting in a more or less rapid lowering of said support according to the position of said valve.

65. In combination in a machine of the class described, a movable support, a motor and a connected tool carried thereby, said support being adapted to be raised and lowered, fluid pressure actuating means for said support, and a valve controlling fluid pressure in said actuating means and comprising a valve housing and valve having means for relatively capacious communication to said actuating means including an inlet-and-outlet pocket in said valve and an outlet port in said housing, said communication means being adapted to be established or interrupted and when established to cause said actuating means to raise said support rapidly, and said valve also comprising means for establishing an egress path from said actuating means comprising said outlet port, and in said valve said pocket, said valve being formed to have an exhaust passage from said pocket and a slit communicating with said exhaust passage and a multiple-duct exhaust port in said housing, said egress path at times having said exhaust passage registering with said multiple-duct exhaust port to effect a rapid lowering of said support and at other times out of registration therewith but with said slit establishing a path between a portion of said multiple-duct exhaust port and said exhaust passage to effect a different but predetermined downward travel of said support.

66. In combination in a machine of the class described, an overhead track, a traveler movable along the same, a tool-operating device suspended therefrom, a tool, means for directing said tool-operating device, and electrical operating means comprising a driving-motor for said traveler, a controller for said motor, electrical means controlling the direction of movement of said traveler and an electric switch carried by said tool-operating device-directing means and adapted to operate said electrical operating means, a source of electrical energy and circuits adapted to render said electrical operating means effective.

67. In combination in a machine of the class described, an overhead structure, a track thereon, a traveler movable on said track, a tool-operating device suspended from said traveler, electrical operating means for the latter, a source of electrical energy, current-supply conductors mounted on said overhead structure insulated therefrom and from each other, current-collectors mounted on but insulated from said traveler and contacting with said current-supply conductors, and circuits from said source of energy rendering said electrical operating means effective.

68. In combination in a machine of the class described, an overhead structure, a traveler movable thereon, a tool-operating device suspended from said traveler, electrical operating means for the latter, a source of electrical energy, current-supply conductors mounted on said overhead structure insulated therefrom and from each other, current-collectors contacting with said conductors each comprising an anti-friction engagement member, a plunger carrying the same, a plunger-holding bracket with a removable side and means exerting pressure on said plunger, a support for said current-collectors secured to said traveler, and means insulating said current-collectors and circuits from said source of energy rendering said electrical operating means effective.

69. In combination in a machine of the class described, an overhead positioning means, a combined supporting frame and fluid pressure lifting mechanism fulcrumed on said positioning means and adapted to be oscillated, a motor and a tool driven thereby both supported from said frame for oscillation therewith and adapted to be lifted.

70. In combination in a machine of the class described, an overhead positioning means, a combined supporting frame and fluid pressure lifting mechanism fulcrumed on said positioning means and adapted to be oscillated, a motor and tool driven thereby both held in given relation to the frame for oscillation with said combined supporting frame and lifting mechanism, said motor being automatically operable in response to the operation of the lifting mechanism.

71. In combination in a machine of the class described, a motor, a tool adapted to be driven thereby, a vertically movable support for said motor and tool, means for lifting said support and means adapted to drive said motor only intermediate its extremes of vertical movement.

72. In combination in a machine of the class described, a rigid freely oscillatory vertically movable motor supporting means, a motor carried by the upper portion thereof, a tool near the lower portion of said means and connections therefor adapted to be driven by said motor, and means under the control of an operator adapted to change the altitude of said tool while the motor is in operation.

73. In combination in a machine of the class described, a depending member, a motor-support slidable thereon, a post rigidly connected to said motor-support, a motor in the latter, a spindle connected therewith and extending with the post from said motor, a tool carried by the spindle, means for sliding said motor support, actuating means therefor comprising control means for said sliding means, a cage adapted to be slid on said post and means transmitting motion from said cage to said control means to operate the same and means preventing rotation between said motor-support and depending member and between said cage and post.

74. In combination in a machine of the class described, a vertically movable motor adapted to drive a tool and an oscillatory fluid actuated device adapted to lift said motor into swinging suspension.

75. In combination in a machine of the class described, a vertically and laterally movable motor adapted to drive a tool, a combined gravity feed and fluid actuated lifting device adapted to elevate said motor and means separate from the motor movable to differently position said fluid device and to variously direct said motor.

76. In combination in a machine of the class described, a gravity actuated tool holder, a motor adapted to rotate said tool holder within a predetermined zone of vertical movement only and means adapted to lift said tool holder for a greater distance than the altitude of said zone.

77. In combination in a machine of the class described, a motor, a tool-holder adapted to be driven thereby, means operable to lift said motor and tool-holder, and means controlled by said lifting means adapted to cause said tool-holder to be driven during only a part of its travel.

78. In combination in a machine of the class described, a motor, a tool holder driven thereby, means adapted to lift said tool holder and automatically operated means adapted to cause the motor to drive the tool holder during only a part of its up or down movement.

79. In combination in a machine of the class described, an electric-motor, a tool holder operatively connected therewith, means adapted to permit gravity feed of said tool holder, means for elevating the tool holder and means for automatically cutting out the motor at predetermined times.

80. In combination in a device of the class described, a frame comprising a motor-support and a post extending away therefrom, means for elevating and lowering said frame, a motor held by said support, a rotatable motor-driven shaft guided by the post, a tool carried from said shaft, and control means for said raising and lowering means, said control means being connected with said post.

81. In combination in a machine of the class described, movable overhead positioning means, actuating means therefor, a tool-operating device suspended from said positioning means comprising a tool-directing post extending away from said positioning means, a tool and tool-driving means rotative with respect to said post near said tool, a handle for guiding the post to direct said tool rotatively mounted on said post, and electrical circuit-forming conductors extending from said actuating means to said handle including relatively movable contacting members fixed, respectively, with respect to said post and handle.

82. In combination in a machine of the class described, movable overhead positioning means, actuating means therefor, a tool-operating device suspended from said positioning means including a post movable with respect to and extending away from said positioning means, a tool adapted to be directed by said post, means for elevating and lowering said tool-operating device and control means for said actuating means and for said elevating and lowering means mounted to move with said post.

83. In combination in a machine of the class described, a trolley provided with a socket portion, tool-actuating mechanism including a ball member rotatively seated in the trolley socket portion, extensions from said trolley and flexible rotation-limiting means connecting said trolley extensions and ball member.

84. In combination in a tool-operating device, a motor-supporting frame, including a work-reaching post, a motor supported by said frame, a bearing carried by said post remote from said motor, a rotatable spindle connected to the motor and engaging said bearing, and a tool-carrying holder driven from the end of said spindle that is juxtaposed to said bearing.

85. In combination in a tool-operating device, a motor-supporting frame including a work-reaching post, a motor supported by said frame, a bearing carried by said post remote from said motor, a rotatable spindle connected to the motor and engaging said bearing, a tool-carrying holder driven from the end of said spindle that is juxtaposed to said bearing and means for altering the distance between said motor and tool-carrying holder.

86. In combination in a machine of the class described, an overhead structure, a traveler movable therealong, a tool-operating device suspended from said traveler, electrical operating means for said device, a source of electrical energy, current-supply conductors extending with said overhead structure, current collectors movable with said traveler and contacting with said conductors and other current-conveying means completing the circuit from said source of energy through said supply-conductors and current collectors to said electrical operating means.

In witness whereof I have hereunto set my hand in the presence of two witnesses.

FREDERICK A. STEVENSON.

Witnesses:
ELIOT W. STUDER,
J. K. BANGS, Jr.